(12) United States Patent
Kostadinov et al.

(10) Patent No.: US 8,463,964 B2
(45) Date of Patent: Jun. 11, 2013

(54) METHODS AND APPARATUS FOR CONTROL CONFIGURATION WITH ENHANCED CHANGE-TRACKING

(75) Inventors: Vladimir Kostadinov, Sharon, MA (US); Keith E. Eldridge, North Easton, MA (US)

(73) Assignee: Invensys Systems, Inc., Foxboro, MA (US)

( * ) Notice: Subject to any disclaimer, the term of this patent is extended or adjusted under 35 U.S.C. 154(b) by 288 days.

(21) Appl. No.: 12/904,608

(22) Filed: Oct. 14, 2010

(65) Prior Publication Data

US 2011/0093098 A1    Apr. 21, 2011

Related U.S. Application Data

(63) Continuation-in-part of application No. 12/474,942, filed on May 29, 2009, now Pat. No. 8,127,060, and a continuation-in-part of application No. 12/474,885, filed on May 29, 2009, now Pat. No. 8,122,434.

(51) Int. Cl.
*G05B 19/18* (2006.01)
*G06F 13/38* (2006.01)
*G05B 23/02* (2006.01)
*G05B 19/042* (2006.01)

(52) U.S. Cl.
CPC .......... *G05B 23/0297* (2013.01); *G05B 19/042* (2013.01)
USPC .............................. 710/104; 700/86; 709/211

(58) Field of Classification Search
USPC ......................................................... 710/104
See application file for complete search history.

(56) References Cited

U.S. PATENT DOCUMENTS

| 3,096,434 | A | 7/1963 | King |
| 3,404,264 | A | 10/1968 | Kugler |
| 3,665,172 | A | 5/1972 | Spaargaren et al. |
| 3,701,280 | A | 10/1972 | Stroman |
| 3,802,590 | A | 4/1974 | Culver |
| 3,810,119 | A | 5/1974 | Zieve et al. |

(Continued)

FOREIGN PATENT DOCUMENTS

| EP | 0411869 A2 | 2/1991 |
| EP | 0592921 | 4/1994 |

(Continued)

OTHER PUBLICATIONS

U.S. Appl. No. 09/721,409 filed Nov. 21, 2000, Venkatraman et al.

(Continued)

*Primary Examiner* — Ryan Stiglic
(74) *Attorney, Agent, or Firm* — Edward S. Jarmolowicz, Esq.

(57) ABSTRACT

The invention provides, in some aspects, a process, environmental, manufacturing, industrial or other such control system (hereinafter, "control system") with enhanced, real-time change tracking. The system includes one or more configurable elements (e.g., field devices), a change tracking system that records of changes to those configurable elements (e.g., for compliance reporting, etc.) and a change detection system that responds to detected changes in configuration of those element(s) by inferring an identity of a person and/or device responsible for a change, the time of the change, and/or the reason for the change. This is unlike prior art systems, in which that such information must be specified, e.g., in a data entry form filled-in by the field engineer, operator or other who is making the change.

21 Claims, 6 Drawing Sheets

Process Control System

U.S. PATENT DOCUMENTS

| | | | |
|---|---|---|---|
| 3,825,905 A | 7/1974 | Allen, Jr. | |
| 3,959,772 A | 5/1976 | Wakasa et al. | |
| 4,006,464 A | 2/1977 | Landell | |
| RE29,383 E | 9/1977 | Gallatin et al. | |
| 4,058,975 A | 11/1977 | Gilbert et al. | |
| 4,096,566 A | 6/1978 | Borie et al. | |
| 4,276,593 A | 6/1981 | Hansen | |
| 4,302,820 A | 11/1981 | Struger et al. | |
| 4,312,068 A | 1/1982 | Goss et al. | |
| 4,323,966 A | 4/1982 | Whiteside et al. | |
| 4,347,563 A | 8/1982 | Paredes et al. | |
| 4,351,023 A | 9/1982 | Richer | |
| 4,377,000 A | 3/1983 | Staab | |
| 4,410,942 A | 10/1983 | Milligan et al. | |
| 4,413,314 A | 11/1983 | Slater et al. | |
| 4,423,486 A | 12/1983 | Berner | |
| 4,428,044 A | 1/1984 | Liron | |
| 4,435,762 A | 3/1984 | Milligan et al. | |
| 4,443,861 A | 4/1984 | Slater | |
| 4,456,997 A | 6/1984 | Spitza | |
| 4,466,098 A | 8/1984 | Southard | |
| 4,471,457 A | 9/1984 | Videki, II | |
| 4,488,226 A | 12/1984 | Wagner, Jr. et al. | |
| 4,493,027 A | 1/1985 | Katz et al. | |
| 4,530,234 A | 7/1985 | Cullick et al. | |
| 4,609,995 A | 9/1986 | Hasebe | |
| 4,612,620 A | 9/1986 | Davis et al. | |
| 4,615,001 A | 9/1986 | Hudgins, Jr. | |
| 4,628,437 A | 12/1986 | Poschmann et al. | |
| 4,633,217 A | 12/1986 | Akano | |
| 4,639,852 A | 1/1987 | Motomiya | |
| 4,641,269 A | 2/1987 | Japenga et al. | |
| 4,641,276 A | 2/1987 | Dunki-Jacobs | |
| 4,648,064 A | 3/1987 | Morley | |
| 4,649,479 A | 3/1987 | Advani et al. | |
| 4,663,704 A | 5/1987 | Jones et al. | |
| 4,672,530 A | 6/1987 | Schuss | |
| 4,675,812 A | 6/1987 | Capowski et al. | |
| 4,682,158 A | 7/1987 | Ito et al. | |
| 4,682,304 A | 7/1987 | Tierney | |
| 4,683,530 A | 7/1987 | Quatse | |
| 4,692,859 A | 9/1987 | Ott | |
| 4,692,918 A | 9/1987 | Elliott et al. | |
| 4,703,421 A | 10/1987 | Abrant et al. | |
| 4,704,676 A | 11/1987 | Flanagan et al. | |
| 4,709,325 A | 11/1987 | Yajima | |
| 4,719,593 A | 1/1988 | Threewitt et al. | |
| 4,727,477 A | 2/1988 | Gavril | |
| 4,733,366 A | 3/1988 | Deyesso et al. | |
| 4,740,955 A | 4/1988 | Litterer et al. | |
| 4,742,349 A | 5/1988 | Miesterfeld et al. | |
| 4,750,109 A | 6/1988 | Kita | |
| 4,770,841 A | 9/1988 | Haley et al. | |
| 4,790,762 A | 12/1988 | Harms et al. | |
| 4,800,512 A | 1/1989 | Busch | |
| 4,805,107 A | 2/1989 | Kieckhafer et al. | |
| 4,806,905 A | 2/1989 | McGowan, III et al. | |
| 4,816,996 A | 3/1989 | Hill et al. | |
| 4,817,094 A | 3/1989 | Lebizay et al. | |
| 4,839,854 A | 6/1989 | Sakami et al. | |
| 4,872,106 A | 10/1989 | Slater | |
| 4,885,707 A | 12/1989 | Nichol et al. | |
| 4,896,290 A | 1/1990 | Rhodes et al. | |
| 4,897,777 A | 1/1990 | Janke et al. | |
| RE33,162 E | 2/1990 | Yoshida et al. | |
| 4,910,658 A | 3/1990 | Dudash et al. | |
| 4,910,691 A | 3/1990 | Skeirik | |
| 4,918,690 A | 4/1990 | Markkula, Jr. et al. | |
| 4,924,462 A | 5/1990 | Sojka | |
| 4,926,158 A | 5/1990 | Zeigler | |
| 4,934,196 A | 6/1990 | Romano | |
| 4,940,974 A | 7/1990 | Sojka | |
| 4,958,277 A | 9/1990 | Hill et al. | |
| 4,959,774 A | 9/1990 | Davis | |
| 4,965,717 A | 10/1990 | Cutts, Jr. et al. | |
| 4,965,742 A | 10/1990 | Skeirik | |
| 4,965,880 A | 10/1990 | Petitjean | |
| 4,991,076 A | 2/1991 | Zifferer et al. | |
| 4,991,170 A | 2/1991 | Kem | |
| 5,008,805 A | 4/1991 | Fiebig et al. | |
| 5,050,165 A | 9/1991 | Yoshioka et al. | |
| 5,068,778 A | 11/1991 | Kosem et al. | |
| 5,089,927 A | 2/1992 | Bulan et al. | |
| 5,089,974 A | 2/1992 | Demeyer et al. | |
| 5,109,692 A | 5/1992 | Fitzgerald | |
| 5,121,318 A | 6/1992 | Lipner et al. | |
| 5,122,948 A | 6/1992 | Zapolin | |
| 5,124,908 A | 6/1992 | Broadbent | |
| 5,129,087 A | 7/1992 | Will | |
| 5,131,092 A | 7/1992 | Sackmann et al. | |
| 5,134,574 A | 7/1992 | Beaverstock et al. | |
| 5,136,704 A | 8/1992 | Danielsen et al. | |
| 5,138,708 A | 8/1992 | Vosbury | |
| 5,140,677 A | 8/1992 | Fleming et al. | |
| 5,146,589 A | 9/1992 | Peet, Jr. et al. | |
| 5,150,289 A | 9/1992 | Badavas | |
| 5,151,930 A | 9/1992 | Hagl | |
| 5,151,978 A | 9/1992 | Bronikowski et al. | |
| 5,151,981 A | 9/1992 | Westcott et al. | |
| 5,159,673 A | 10/1992 | Sackmann et al. | |
| 5,162,986 A | 11/1992 | Graber et al. | |
| 5,163,055 A | 11/1992 | Lee et al. | |
| 5,164,894 A | 11/1992 | Cunningham-Reid et al. | |
| 5,166,685 A | 11/1992 | Campbell, Jr. et al. | |
| 5,167,009 A | 11/1992 | Skeirik | |
| 5,168,276 A | 12/1992 | Huston et al. | |
| 5,168,441 A | 12/1992 | Onarheim et al. | |
| 5,170,340 A | 12/1992 | Prokop et al. | |
| 5,175,698 A | 12/1992 | Barbanell | |
| 5,175,829 A | 12/1992 | Stumpf et al. | |
| 5,181,978 A | 1/1993 | Ochiai | |
| 5,193,175 A | 3/1993 | Cutts, Jr. et al. | |
| 5,197,114 A | 3/1993 | Skeirik | |
| 5,202,961 A | 4/1993 | Mills et al. | |
| 5,212,784 A | 5/1993 | Sparks | |
| 5,218,187 A | 6/1993 | Koenck et al. | |
| 5,224,203 A | 6/1993 | Skeirik | |
| 5,233,615 A | 8/1993 | Goetz | |
| 5,245,704 A | 9/1993 | Weber et al. | |
| 5,249,274 A | 9/1993 | Sztipanovits et al. | |
| 5,251,125 A | 10/1993 | Karnowski et al. | |
| 5,255,367 A | 10/1993 | Bruckert et al. | |
| 5,257,208 A | 10/1993 | Brown et al. | |
| 5,258,999 A | 11/1993 | Wernimont et al. | |
| 5,271,013 A | 12/1993 | Gleeson | |
| 5,276,901 A | 1/1994 | Howell et al. | |
| 5,283,729 A | 2/1994 | Lloyd | |
| 5,289,365 A | 2/1994 | Caldwell et al. | |
| 5,291,390 A | 3/1994 | Satou | |
| 5,295,258 A | 3/1994 | Jewett et al. | |
| 5,295,263 A | 3/1994 | Kojima et al. | |
| 5,297,143 A | 3/1994 | Fridrich et al. | |
| 5,301,346 A | 4/1994 | Notarianni et al. | |
| 5,302,952 A | 4/1994 | Campbell, Jr. et al. | |
| 5,303,227 A | 4/1994 | Herold et al. | |
| 5,303,375 A | 4/1994 | Collins et al. | |
| 5,303,392 A | 4/1994 | Carney et al. | |
| 5,307,346 A | 4/1994 | Fieldhouse | |
| 5,307,372 A | 4/1994 | Sawyer et al. | |
| 5,307,463 A | 4/1994 | Hyatt et al. | |
| 5,309,556 A | 5/1994 | Sismilich | |
| 5,310,998 A | 5/1994 | Okuno | |
| 5,317,726 A | 5/1994 | Horst | |
| 5,325,339 A | 6/1994 | Yost et al. | |
| 5,327,144 A | 7/1994 | Stilp et al. | |
| 5,335,186 A | 8/1994 | Tarrant | |
| 5,335,221 A | 8/1994 | Snowbarger et al. | |
| 5,339,362 A | 8/1994 | Harris | |
| 5,339,680 A | 8/1994 | Bronkal et al. | |
| 5,347,181 A | 9/1994 | Ashby et al. | |
| 5,349,343 A | 9/1994 | Oliver | |
| 5,349,678 A | 9/1994 | Morris et al. | |
| 5,352,033 A | 10/1994 | Gresham et al. | |
| 5,353,217 A | 10/1994 | Berghs et al. | |
| 5,359,721 A | 10/1994 | Kempf et al. | |
| 5,361,198 A | 11/1994 | Harmon et al. | |
| 5,367,640 A | 11/1994 | Hamilton et al. | |

| | | | | | |
|---|---|---|---|---|---|
| 5,371,895 A | 12/1994 | Bristol | 5,526,353 A | 6/1996 | Henley et al. |
| 5,377,315 A | 12/1994 | Leggett | 5,530,377 A | 6/1996 | Walls |
| 5,381,529 A | 1/1995 | Matsushima | 5,530,643 A | 6/1996 | Hodorowski |
| 5,384,910 A | 1/1995 | Torres | 5,530,868 A | 6/1996 | Record et al. |
| 5,386,373 A | 1/1995 | Keeler et al. | 5,531,328 A | 7/1996 | Rochelo et al. |
| 5,386,417 A | 1/1995 | Daugherty et al. | 5,534,912 A | 7/1996 | Kostreski |
| 5,390,321 A | 2/1995 | Proesel | 5,535,425 A | 7/1996 | Watanabe |
| 5,392,280 A | 2/1995 | Zheng | 5,537,548 A | 7/1996 | Fin et al. |
| 5,392,389 A | 2/1995 | Fleming | 5,539,638 A | 7/1996 | Keeler et al. |
| 5,394,522 A | 2/1995 | Sanchez-Frank et al. | 5,539,909 A | 7/1996 | Tanaka et al. |
| 5,398,331 A | 3/1995 | Huang et al. | 5,541,810 A | 7/1996 | Donhauser et al. |
| 5,400,140 A | 3/1995 | Johnston | 5,542,039 A | 7/1996 | Brinson et al. |
| 5,405,779 A | 4/1995 | McCabe et al. | 5,544,008 A | 8/1996 | Dimmick et al. |
| 5,408,603 A | 4/1995 | Van de Lavoir et al. | 5,544,073 A | 8/1996 | Piety et al. |
| 5,410,141 A | 4/1995 | Koenck et al. | 5,544,321 A | 8/1996 | Theimer et al. |
| 5,410,492 A | 4/1995 | Gross et al. | 5,548,528 A | 8/1996 | Keeler et al. |
| 5,410,717 A | 4/1995 | Floro | 5,549,137 A | 8/1996 | Lenz et al. |
| 5,420,977 A | 5/1995 | Sztipanovits et al. | 5,550,980 A | 8/1996 | Pascucci et al. |
| 5,421,017 A | 5/1995 | Scholz et al. | 5,551,047 A | 8/1996 | Mori et al. |
| 5,422,816 A | 6/1995 | Sprague et al. | 5,555,213 A | 9/1996 | DeLong |
| 5,426,732 A | 6/1995 | Boies et al. | 5,555,416 A | 9/1996 | Owens et al. |
| 5,428,734 A | 6/1995 | Haynes et al. | 5,555,437 A | 9/1996 | Packer |
| 5,428,769 A | 6/1995 | Glaser et al. | 5,555,510 A | 9/1996 | Verseput et al. |
| 5,428,781 A | 6/1995 | Duault et al. | 5,557,559 A | 9/1996 | Rhodes |
| 5,432,705 A | 7/1995 | Severt et al. | 5,559,691 A | 9/1996 | Monta et al. |
| 5,432,711 A | 7/1995 | Jackson et al. | 5,559,963 A | 9/1996 | Gregg et al. |
| 5,434,952 A | 7/1995 | Yen et al. | 5,561,770 A | 10/1996 | de Bruijn et al. |
| 5,434,997 A | 7/1995 | Landry et al. | 5,563,400 A | 10/1996 | Le Roux |
| 5,437,007 A | 7/1995 | Bailey et al. | 5,564,055 A | 10/1996 | Asnaashari et al. |
| 5,440,237 A | 8/1995 | Brown et al. | 5,566,320 A | 10/1996 | Hubert |
| 5,442,639 A | 8/1995 | Crowder et al. | 5,568,378 A | 10/1996 | Wojsznis |
| 5,442,791 A | 8/1995 | Wrabetz et al. | 5,570,300 A | 10/1996 | Henry et al. |
| 5,444,851 A | 8/1995 | Woest | 5,572,643 A | 11/1996 | Judson |
| 5,444,861 A | 8/1995 | Adamec et al. | 5,572,673 A | 11/1996 | Shurts |
| 5,450,403 A | 9/1995 | Ichii et al. | 5,576,946 A | 11/1996 | Bender et al. |
| 5,450,425 A | 9/1995 | Gunn et al. | 5,579,220 A | 11/1996 | Barthel et al. |
| 5,450,764 A | 9/1995 | Johnston | 5,579,487 A | 11/1996 | Meyerson et al. |
| 5,451,923 A | 9/1995 | Seberger et al. | 5,581,760 A | 12/1996 | Atkinson et al. |
| 5,451,939 A | 9/1995 | Price | 5,586,066 A | 12/1996 | White et al. |
| 5,452,201 A | 9/1995 | Pieronek et al. | 5,586,112 A | 12/1996 | Tabata |
| 5,453,933 A | 9/1995 | Wright et al. | 5,586,156 A | 12/1996 | Gaubatz |
| 5,457,797 A | 10/1995 | Butterworth et al. | 5,586,329 A | 12/1996 | Knudsen et al. |
| 5,459,825 A | 10/1995 | Anderson et al. | 5,586,330 A | 12/1996 | Knudsen et al. |
| 5,459,839 A | 10/1995 | Swarts et al. | 5,587,899 A | 12/1996 | Ho et al. |
| 5,461,611 A | 10/1995 | Drake, Jr. et al. | 5,594,858 A | 1/1997 | Blevins |
| 5,461,710 A | 10/1995 | Bloomfield et al. | 5,594,899 A | 1/1997 | Knudsen et al. |
| 5,463,735 A | 10/1995 | Pascucci et al. | 5,596,331 A | 1/1997 | Bonaffini et al. |
| 5,467,264 A | 11/1995 | Rauch et al. | 5,596,752 A | 1/1997 | Knudsen et al. |
| 5,469,150 A | 11/1995 | Sitte | 5,598,536 A | 1/1997 | Slaughter, III et al. |
| 5,469,570 A | 11/1995 | Shibata | 5,598,566 A | 1/1997 | Pascucci et al. |
| 5,475,856 A | 12/1995 | Kogge | 5,600,845 A | 2/1997 | Gilson |
| 5,481,715 A | 1/1996 | Hamilton et al. | 5,602,749 A | 2/1997 | Vosburgh |
| 5,481,718 A | 1/1996 | Ryu et al. | 5,604,737 A | 2/1997 | Iwami et al. |
| 5,481,741 A | 1/1996 | McKaskle et al. | 5,604,871 A | 2/1997 | Pecone |
| 5,483,660 A | 1/1996 | Yishay et al. | 5,608,607 A | 3/1997 | Dittmer |
| 5,485,617 A | 1/1996 | Stutz et al. | 5,608,608 A | 3/1997 | Flint et al. |
| 5,485,620 A | 1/1996 | Sadre et al. | 5,611,057 A | 3/1997 | Pecone et al. |
| 5,490,276 A | 2/1996 | Doli, Jr. et al. | 5,613,148 A | 3/1997 | Bezviner et al. |
| 5,491,625 A | 2/1996 | Pressnall et al. | 5,613,164 A | 3/1997 | DiAngelo et al. |
| 5,491,791 A | 2/1996 | Glowny et al. | 5,613,190 A | 3/1997 | Hylton |
| 5,493,534 A | 2/1996 | Mok | 5,617,540 A | 4/1997 | Civanlar et al. |
| 5,499,023 A | 3/1996 | Goldschmidt | 5,621,871 A | 4/1997 | Jaremko et al. |
| 5,499,365 A | 3/1996 | Anderson et al. | 5,621,890 A | 4/1997 | Notarianni et al. |
| 5,499,371 A | 3/1996 | Henninger et al. | 5,623,592 A | 4/1997 | Carlson et al. |
| 5,500,934 A | 3/1996 | Austin et al. | 5,623,670 A | 4/1997 | Bohannon et al. |
| 5,501,608 A | 3/1996 | Scheer et al. | 5,627,979 A | 5/1997 | Chang et al. |
| 5,504,672 A | 4/1996 | Hardiman et al. | 5,629,872 A | 5/1997 | Gross et al. |
| 5,504,895 A | 4/1996 | Kurosawa et al. | 5,629,949 A | 5/1997 | Zook |
| 5,504,902 A | 4/1996 | McGrath et al. | 5,630,056 A | 5/1997 | Horvath et al. |
| 5,509,811 A | 4/1996 | Homic | 5,630,152 A | 5/1997 | DeLuca et al. |
| 5,513,095 A | 4/1996 | Pajonk | 5,633,811 A | 5/1997 | Canada et al. |
| 5,513,192 A | 4/1996 | Janku et al. | 5,642,259 A | 6/1997 | Ma |
| 5,513,354 A | 4/1996 | Dwork et al. | 5,642,511 A | 6/1997 | Chow et al. |
| 5,517,645 A | 5/1996 | Stutz et al. | 5,648,768 A | 7/1997 | Bouve |
| 5,517,655 A | 5/1996 | Collins et al. | 5,649,121 A | 7/1997 | Budman et al. |
| 5,519,605 A | 5/1996 | Cawlfield | 5,655,092 A | 8/1997 | Ojala |
| 5,519,701 A | 5/1996 | Colmant et al. | 5,659,680 A | 8/1997 | Cunningham et al. |
| 5,522,044 A | 5/1996 | Pascucci et al. | 5,659,727 A | 8/1997 | Velissaropoulos et al. |
| 5,526,287 A | 6/1996 | French | 5,664,101 A | 9/1997 | Picache |

| Patent | Date | Inventor |
|---|---|---|
| 5,664,168 A | 9/1997 | Yishay et al. |
| 5,671,374 A | 9/1997 | Postman et al. |
| 5,671,436 A | 9/1997 | Morris et al. |
| 5,673,401 A | 9/1997 | Volk et al. |
| 5,676,141 A | 10/1997 | Hollub |
| 5,680,404 A | 10/1997 | Gray |
| 5,680,409 A | 10/1997 | Qin et al. |
| 5,682,317 A | 10/1997 | Keeler et al. |
| 5,682,476 A | 10/1997 | Tapperson et al. |
| 5,687,316 A | 11/1997 | Graziano et al. |
| 5,691,897 A | 11/1997 | Brown et al. |
| 5,700,090 A | 12/1997 | Eryurek |
| 5,701,414 A | 12/1997 | Cheng et al. |
| 5,701,484 A | 12/1997 | Artsy |
| 5,704,011 A | 12/1997 | Hansen et al. |
| 5,706,502 A | 1/1998 | Foley et al. |
| 5,708,709 A | 1/1998 | Rose |
| 5,708,779 A | 1/1998 | Graziano et al. |
| 5,713,045 A | 1/1998 | Berdahl |
| 5,715,178 A | 2/1998 | Scarola et al. |
| 5,716,221 A | 2/1998 | Kantner |
| 5,717,880 A | 2/1998 | Imai et al. |
| 5,717,925 A | 2/1998 | Harper et al. |
| 5,719,761 A | 2/1998 | Gatti et al. |
| 5,724,025 A | 3/1998 | Tavori |
| 5,726,911 A | 3/1998 | Canada et al. |
| 5,726,912 A | 3/1998 | Krall, Jr. et al. |
| 5,727,128 A | 3/1998 | Morrison |
| 5,732,074 A | 3/1998 | Spaur et al. |
| 5,732,218 A | 3/1998 | Bland et al. |
| 5,734,902 A | 3/1998 | Atkins et al. |
| 5,737,529 A | 4/1998 | Dolin, Jr. et al. |
| 5,740,429 A | 4/1998 | Wang et al. |
| 5,740,441 A | 4/1998 | Yellin et al. |
| 5,742,596 A | 4/1998 | Baratz et al. |
| 5,742,762 A | 4/1998 | Scholl et al. |
| 5,745,049 A | 4/1998 | Akiyama et al. |
| 5,746,511 A | 5/1998 | Eryurek et al. |
| 5,748,467 A | 5/1998 | Qin et al. |
| 5,748,896 A | 5/1998 | Daly et al. |
| 5,748,912 A | 5/1998 | Lee |
| 5,751,574 A | 5/1998 | Loebig |
| 5,752,007 A | 5/1998 | Morrison |
| 5,752,008 A | 5/1998 | Bowling |
| 5,752,246 A | 5/1998 | Rogers et al. |
| 5,754,189 A | 5/1998 | Doi et al. |
| 5,754,772 A | 5/1998 | Leaf |
| 5,754,830 A | 5/1998 | Butts et al. |
| 5,757,925 A | 5/1998 | Faybishenko |
| 5,758,073 A | 5/1998 | Liang et al. |
| 5,758,075 A | 5/1998 | Graziano et al. |
| 5,761,033 A | 6/1998 | Wilhelm |
| 5,761,090 A | 6/1998 | Gross et al. |
| 5,761,405 A | 6/1998 | Tadamura et al. |
| 5,761,421 A | 6/1998 | van Hoff et al. |
| 5,761,477 A | 6/1998 | Wahbe et al. |
| 5,761,499 A | 6/1998 | Sonderegger |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,378 A | 6/1998 | Yang |
| 5,774,670 A | 6/1998 | Montulli |
| 5,777,874 A | 7/1998 | Flood et al. |
| 5,778,368 A | 7/1998 | Hogan et al. |
| 5,784,557 A | 7/1998 | Oprescu |
| 5,787,247 A | 7/1998 | Norin et al. |
| 5,787,272 A | 7/1998 | Gupta et al. |
| 5,787,280 A | 7/1998 | Joseph et al. |
| 5,790,791 A | 8/1998 | Chong et al. |
| 5,793,963 A | 8/1998 | Tapperson et al. |
| 5,794,071 A | 8/1998 | Watanabe et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,802,389 A | 9/1998 | McNutt |
| 5,805,153 A | 9/1998 | Nielsen |
| 5,805,442 A | 9/1998 | Crater et al. |
| 5,805,889 A | 9/1998 | Van De Vanter |
| 5,805,922 A | 9/1998 | Sim et al. |
| 5,809,247 A | 9/1998 | Richardson et al. |
| 5,812,394 A | 9/1998 | Lewis et al. |
| 5,815,152 A | 9/1998 | Collier et al. |
| 5,815,659 A | 9/1998 | Umetsu et al. |
| 5,815,710 A | 9/1998 | Martin et al. |
| 5,822,220 A | 10/1998 | Baines |
| 5,828,567 A | 10/1998 | Eryurek et al. |
| 5,828,851 A | 10/1998 | Nixon et al. |
| 5,828,882 A | 10/1998 | Hinckley |
| 5,831,669 A | 11/1998 | Adrain |
| 5,832,268 A | 11/1998 | Anderson et al. |
| 5,832,418 A | 11/1998 | Meyer |
| 5,835,704 A | 11/1998 | Li et al. |
| 5,835,712 A | 11/1998 | DuFresne |
| 5,835,724 A | 11/1998 | Smith |
| 5,835,789 A | 11/1998 | Ueda et al. |
| 5,838,563 A | 11/1998 | Dove et al. |
| 5,838,910 A | 11/1998 | Domenikos et al. |
| 5,838,920 A | 11/1998 | Rosborough |
| 5,838,969 A | 11/1998 | Jacklin et al. |
| 5,839,094 A | 11/1998 | French |
| 5,841,360 A | 11/1998 | Binder |
| 5,841,654 A | 11/1998 | Verissimo et al. |
| 5,841,963 A | 11/1998 | Nakamikawa et al. |
| 5,841,991 A | 11/1998 | Russell |
| 5,844,601 A | 12/1998 | McPheely et al. |
| 5,844,796 A | 12/1998 | Araki |
| 5,844,804 A | 12/1998 | Schussler |
| 5,845,078 A | 12/1998 | Tezuka et al. |
| 5,845,230 A | 12/1998 | Lamberson |
| 5,847,957 A | 12/1998 | Cohen et al. |
| 5,848,274 A | 12/1998 | Hamby et al. |
| 5,848,393 A | 12/1998 | Goodridge et al. |
| 5,854,750 A | 12/1998 | Phillips et al. |
| 5,854,944 A | 12/1998 | Catherwood et al. |
| 5,859,966 A | 1/1999 | Hayman et al. |
| 5,862,052 A | 1/1999 | Nixon et al. |
| 5,864,773 A | 1/1999 | Barna et al. |
| 5,867,704 A | 2/1999 | Tanaka et al. |
| 5,872,973 A | 2/1999 | Mitchell et al. |
| 5,872,992 A | 2/1999 | Tietjen et al. |
| 5,873,089 A | 2/1999 | Regache |
| 5,874,990 A | 2/1999 | Kato |
| 5,875,430 A | 2/1999 | Koether |
| 5,876,122 A | 3/1999 | Eryurek |
| 5,878,415 A | 3/1999 | Olds |
| 5,880,775 A | 3/1999 | Ross |
| 5,884,014 A | 3/1999 | Huttenlocher et al. |
| 5,903,455 A | 5/1999 | Sharpe, Jr. et al. |
| 5,903,894 A | 5/1999 | Reneris |
| 5,905,248 A | 5/1999 | Russell et al. |
| 5,905,963 A | 5/1999 | Lysejko |
| 5,907,675 A | 5/1999 | Aahlad |
| 5,909,368 A | 6/1999 | Nixon et al. |
| 5,909,586 A | 6/1999 | Anderson |
| 5,917,822 A | 6/1999 | Lyles et al. |
| 5,917,840 A | 6/1999 | Cheney et al. |
| 5,919,247 A | 7/1999 | Van Hoff et al. |
| 5,920,479 A | 7/1999 | Sojoodi et al. |
| 5,922,050 A | 7/1999 | Madany |
| 5,927,398 A | 7/1999 | Maciulewicz |
| 5,928,345 A | 7/1999 | Tetzlaff et al. |
| 5,930,768 A | 7/1999 | Hooban |
| 5,935,242 A | 8/1999 | Madany et al. |
| 5,935,249 A | 8/1999 | Stern et al. |
| 5,940,294 A | 8/1999 | Dove |
| 5,940,839 A | 8/1999 | Chen et al. |
| 5,946,487 A | 8/1999 | Dangelo |
| 5,950,006 A | 9/1999 | Crater et al. |
| 5,950,172 A | 9/1999 | Klingman |
| 5,956,484 A | 9/1999 | Rosenberg et al. |
| 5,956,487 A | 9/1999 | Venkatraman et al. |
| 5,956,716 A | 9/1999 | Kenner et al. |
| 5,959,487 A | 9/1999 | Kawamura |
| 5,960,205 A | 9/1999 | Mao et al. |
| 5,960,214 A | 9/1999 | Sharpe, Jr. et al. |
| 5,966,304 A | 10/1999 | Cook et al. |

| Patent | Date | Inventor |
|---|---|---|
| 5,969,967 A | 10/1999 | Aahlad et al. |
| 5,970,430 A | 10/1999 | Burns et al. |
| 5,974,497 A | 10/1999 | Teshome |
| 5,975,737 A | 11/1999 | Crater et al. |
| 5,978,578 A | 11/1999 | Azarya et al. |
| 5,978,933 A | 11/1999 | Wyld et al. |
| 5,980,078 A | 11/1999 | Krivoshein et al. |
| 5,980,090 A | 11/1999 | Royal, Jr. et al. |
| 5,982,362 A | 11/1999 | Crater et al. |
| 5,982,762 A | 11/1999 | Anzai et al. |
| 5,987,506 A | 11/1999 | Carter |
| 5,988,852 A | 11/1999 | Nakanishi |
| 5,991,795 A | 11/1999 | Howard et al. |
| 5,994,998 A | 11/1999 | Fisher et al. |
| 5,995,916 A | 11/1999 | Nixon et al. |
| 6,002,104 A | 12/1999 | Hsu |
| 6,006,164 A | 12/1999 | McCarty et al. |
| 6,006,171 A | 12/1999 | Vines et al. |
| 6,008,985 A | 12/1999 | Lake et al. |
| 6,009,103 A | 12/1999 | Woundy |
| 6,014,591 A | 1/2000 | Ikeda |
| 6,014,612 A | 1/2000 | Larson et al. |
| 6,016,515 A | 1/2000 | Shaw et al. |
| 6,018,627 A | 1/2000 | Iyengar et al. |
| 6,018,816 A | 1/2000 | Tateyama |
| 6,026,336 A | 2/2000 | Sakurai et al. |
| 6,026,352 A | 2/2000 | Burns et al. |
| 6,032,151 A | 2/2000 | Arnold et al. |
| 6,032,208 A | 2/2000 | Nixon et al. |
| H1845 H | 3/2000 | Kelly |
| 6,033,257 A | 3/2000 | Lake et al. |
| 6,035,264 A | 3/2000 | Donaldson et al. |
| 6,038,271 A | 3/2000 | Olaker et al. |
| 6,038,486 A | 3/2000 | Saitoh et al. |
| 6,044,305 A | 3/2000 | Larson et al. |
| 6,047,222 A | 4/2000 | Burns et al. |
| 6,049,578 A | 4/2000 | Senechal et al. |
| 6,049,775 A | 4/2000 | Gertner et al. |
| 6,052,629 A | 4/2000 | Leatherman et al. |
| 6,055,633 A | 4/2000 | Schrier et al. |
| 6,061,603 A | 5/2000 | Papadopoulos et al. |
| 6,070,186 A | 5/2000 | Nishio |
| 6,070,250 A | 5/2000 | Yeager et al. |
| 6,073,109 A | 6/2000 | Flores et al. |
| 6,075,863 A | 6/2000 | Krishnan et al. |
| 6,076,124 A | 6/2000 | Korowitz et al. |
| 6,078,320 A | 6/2000 | Dove et al. |
| 6,078,848 A | 6/2000 | Bernstein et al. |
| 6,080,207 A | 6/2000 | Kroening et al. |
| 6,085,120 A | 7/2000 | Schwerdtfeger et al. |
| 6,088,665 A | 7/2000 | Burns et al. |
| 6,094,600 A | 7/2000 | Sharpe, Jr. et al. |
| 6,094,655 A | 7/2000 | Rogers et al. |
| 6,094,684 A | 7/2000 | Pallmann |
| 6,095,674 A | 8/2000 | Verissimo et al. |
| 6,097,761 A | 8/2000 | Buhring et al. |
| 6,098,116 A | 8/2000 | Nixon et al. |
| 6,104,391 A | 8/2000 | Johnston, Jr. et al. |
| 6,104,875 A | 8/2000 | Gallagher et al. |
| 6,105,132 A | 8/2000 | Fritch et al. |
| 6,108,662 A | 8/2000 | Hoskins et al. |
| 6,112,020 A | 8/2000 | Wright |
| 6,112,246 A | 8/2000 | Horbal et al. |
| 6,115,468 A | 9/2000 | De Nicolo |
| 6,115,744 A | 9/2000 | Robins et al. |
| 6,129,449 A | 10/2000 | McCain et al. |
| 6,129,724 A | 10/2000 | Fleischman et al. |
| 6,131,067 A | 10/2000 | Girerd et al. |
| 6,133,914 A | 10/2000 | Rogers et al. |
| 6,134,559 A | 10/2000 | Brumme et al. |
| 6,138,140 A | 10/2000 | Yokote |
| 6,138,174 A | 10/2000 | Keeley |
| 6,139,177 A | 10/2000 | Venkatraman et al. |
| 6,140,911 A | 10/2000 | Fisher et al. |
| 6,141,794 A | 10/2000 | Dice et al. |
| 6,148,346 A | 11/2000 | Hanson |
| 6,148,391 A | 11/2000 | Petrick |
| 6,151,625 A | 11/2000 | Swales et al. |
| 6,154,875 A | 11/2000 | Tanaka et al. |
| 6,157,864 A | 12/2000 | Schwenke et al. |
| 6,160,484 A | 12/2000 | Spahl et al. |
| 6,167,253 A | 12/2000 | Farris et al. |
| 6,167,464 A | 12/2000 | Kretschmann |
| 6,170,007 B1 | 1/2001 | Venkatraman et al. |
| 6,173,414 B1 | 1/2001 | Zumkehr et al. |
| 6,175,556 B1 | 1/2001 | Allen, Jr. et al. |
| 6,176,421 B1 | 1/2001 | Royal, Jr. et al. |
| 6,183,289 B1 | 2/2001 | Lake et al. |
| 6,185,611 B1 | 2/2001 | Waldo et al. |
| 6,192,281 B1 | 2/2001 | Brown et al. |
| 6,195,591 B1 | 2/2001 | Nixon et al. |
| 6,195,694 B1 | 2/2001 | Chen et al. |
| 6,195,774 B1 | 2/2001 | Jacobson |
| 6,199,068 B1 | 3/2001 | Carpenter |
| 6,199,195 B1 | 3/2001 | Goodwin et al. |
| 6,201,996 B1 | 3/2001 | Crater et al. |
| 6,212,440 B1 | 4/2001 | Suzuki |
| 6,212,575 B1 | 4/2001 | Cleron et al. |
| 6,212,608 B1 | 4/2001 | Bak |
| 6,216,158 B1 | 4/2001 | Luo et al. |
| 6,218,930 B1 | 4/2001 | Katzenberg et al. |
| 6,219,708 B1 | 4/2001 | Martenson |
| 6,226,783 B1 | 5/2001 | Limondin et al. |
| 6,236,909 B1 | 5/2001 | Colson et al. |
| 6,246,748 B1 | 6/2001 | Yano |
| 6,260,187 B1 | 7/2001 | Cirne |
| 6,263,487 B1 | 7/2001 | Stripf et al. |
| 6,266,716 B1 | 7/2001 | Wilson et al. |
| 6,266,724 B1 | 7/2001 | Harari et al. |
| 6,268,789 B1 | 7/2001 | Diamant et al. |
| 6,269,473 B1 | 7/2001 | Freed et al. |
| 6,272,529 B1 | 8/2001 | Lum |
| 6,272,556 B1 | 8/2001 | Gish |
| 6,282,454 B1 | 8/2001 | Papadopoulos et al. |
| 6,282,455 B1 | 8/2001 | Engdahl |
| 6,285,966 B1 | 9/2001 | Brown et al. |
| 6,289,299 B1 | 9/2001 | Daniel, Jr. et al. |
| 6,295,356 B1 | 9/2001 | De Nicolo |
| 6,295,513 B1 | 9/2001 | Thackston |
| 6,298,377 B1 | 10/2001 | Hartikainen et al. |
| 6,308,317 B1 | 10/2001 | Wilkinson et al. |
| 6,311,101 B1 | 10/2001 | Kastner |
| 6,314,448 B1 | 11/2001 | Conner et al. |
| 6,314,464 B1 | 11/2001 | Murata et al. |
| 6,317,701 B1 | 11/2001 | Pyotsia et al. |
| 6,324,607 B1 | 11/2001 | Korowitz et al. |
| 6,327,511 B1 | 12/2001 | Naismith et al. |
| 6,332,163 B1 | 12/2001 | Bowman-Amuah |
| 6,334,161 B1 | 12/2001 | Suzuki et al. |
| 6,336,142 B1 | 1/2002 | Kato et al. |
| 6,345,295 B1 | 2/2002 | Beardsley et al. |
| 6,345,382 B1 | 2/2002 | Hughes |
| 6,348,874 B1 | 2/2002 | Cole et al. |
| 6,349,274 B1 | 2/2002 | Kay et al. |
| 6,349,287 B1 | 2/2002 | Hayashi |
| 6,353,859 B1 | 3/2002 | McKeehan et al. |
| 6,353,860 B1 | 3/2002 | Hare et al. |
| 6,360,091 B1 | 3/2002 | Schellinger et al. |
| 6,366,300 B1 | 4/2002 | Ohara et al. |
| 6,370,448 B1 | 4/2002 | Eryurek |
| 6,370,573 B1 | 4/2002 | Bowman-Amuah |
| 6,373,841 B1 | 4/2002 | Goh et al. |
| 6,377,543 B1 | 4/2002 | Grover et al. |
| 6,377,859 B1 | 4/2002 | Brown et al. |
| 6,382,226 B1 | 5/2002 | Larson et al. |
| 6,393,050 B1 | 5/2002 | Liu |
| 6,405,099 B1 | 6/2002 | Nagai et al. |
| 6,405,210 B1 | 6/2002 | Doyle et al. |
| 6,412,070 B1 | 6/2002 | Van Dyke et al. |
| 6,418,499 B1 | 7/2002 | Korowitz et al. |
| 6,424,883 B1 | 7/2002 | Hosokawa et al. |
| 6,429,885 B1 | 8/2002 | Saib et al. |
| 6,430,564 B1 | 8/2002 | Judge et al. |
| 6,434,594 B1 | 8/2002 | Wesemann |
| 6,438,182 B1 | 8/2002 | Olaker et al. |
| 6,442,442 B1 | 8/2002 | Weinhofer |
| 6,445,962 B1 | 9/2002 | Blevins et al. |
| 6,449,624 B1 | 9/2002 | Hammack et al. |

| | | | |
|---|---|---|---|
| 6,449,715 B1 | 9/2002 | Krivoshein | |
| 6,480,903 B1 | 11/2002 | Voutaz et al. | |
| 6,480,955 B1 | 11/2002 | DeKoning et al. | |
| 6,487,214 B1 | 11/2002 | Bachar | |
| 6,487,558 B1 | 11/2002 | Hitchcock | |
| 6,493,405 B1 | 12/2002 | Olaker et al. | |
| 6,496,892 B1 | 12/2002 | Lake et al. | |
| 6,499,048 B1 | 12/2002 | Williams | |
| 6,501,995 B1 | 12/2002 | Kinney et al. | |
| 6,510,352 B1 | 1/2003 | Badavas et al. | |
| 6,526,455 B1 | 2/2003 | Kamimura | |
| 6,526,516 B1 | 2/2003 | Ishikawa et al. | |
| 6,532,531 B1 | 3/2003 | O'Connor et al. | |
| 6,557,056 B1 | 4/2003 | Lanteigne et al. | |
| 6,563,420 B2 | 5/2003 | Brown et al. | |
| 6,574,515 B1 | 6/2003 | Kirkpatrick et al. | |
| 6,574,694 B1 | 6/2003 | Chen et al. | |
| 6,594,692 B1 | 7/2003 | Reisman | |
| 6,598,224 B1 | 7/2003 | Maeda et al. | |
| 6,609,147 B1 | 8/2003 | Matsuda et al. | |
| 6,612,022 B1 | 9/2003 | Gale et al. | |
| 6,618,754 B1 | 9/2003 | Gosling | |
| 6,622,147 B1 | 9/2003 | Smiga et al. | |
| 6,636,900 B2 | 10/2003 | Abdelnur | |
| 6,640,308 B1 | 10/2003 | Keyghobad et al. | |
| 6,647,495 B1 | 11/2003 | Takeuchi et al. | |
| 6,654,353 B1 | 11/2003 | Tokura et al. | |
| 6,671,763 B1 | 12/2003 | Korowitz et al. | |
| 6,675,193 B1 | 1/2004 | Slavin et al. | |
| 6,687,698 B1 | 2/2004 | Nixon et al. | |
| 6,700,869 B1 | 3/2004 | Falco et al. | |
| 6,701,284 B1 | 3/2004 | Huntley et al. | |
| 6,718,215 B2 | 4/2004 | Friedrich et al. | |
| 6,718,533 B1 | 4/2004 | Schneider et al. | |
| 6,738,388 B1 | 5/2004 | Stevenson et al. | |
| 6,754,885 B1 * | 6/2004 | Dardinski et al. | 717/113 |
| 6,760,687 B2 | 7/2004 | Apel et al. | |
| 6,763,370 B1 | 7/2004 | Schmeidler et al. | |
| 6,775,707 B1 | 8/2004 | Bennett et al. | |
| 6,788,980 B1 * | 9/2004 | Johnson | 700/1 |
| 6,789,054 B1 | 9/2004 | Makhlouf | |
| 6,792,321 B2 | 9/2004 | Sepe, Jr. | |
| 6,799,148 B2 | 9/2004 | Ling et al. | |
| 6,799,185 B2 | 9/2004 | Wallman et al. | |
| 6,799,195 B1 | 9/2004 | Thibault et al. | |
| 6,806,847 B2 | 10/2004 | Nixon et al. | |
| 6,807,558 B1 | 10/2004 | Hassett et al. | |
| 6,826,590 B1 | 11/2004 | Glanzer et al. | |
| 6,832,223 B1 | 12/2004 | Scheifler et al. | |
| 6,850,973 B1 | 2/2005 | Larson et al. | |
| 6,853,867 B1 | 2/2005 | Klindt et al. | |
| 6,868,538 B1 | 3/2005 | Nixon et al. | |
| 6,874,082 B2 | 3/2005 | Tateyama et al. | |
| 6,888,541 B2 | 5/2005 | Morse | |
| 6,895,409 B2 | 5/2005 | Uluakar et al. | |
| 6,928,396 B2 | 8/2005 | Thackston | |
| 6,959,356 B2 | 10/2005 | Packwood et al. | |
| 6,978,194 B2 | 12/2005 | McIlhany et al. | |
| 6,983,227 B1 | 1/2006 | Thalhammer-Reyero | |
| 7,020,532 B2 | 3/2006 | Johnson et al. | |
| 7,024,282 B2 | 4/2006 | Coogan et al. | |
| 7,032,045 B2 | 4/2006 | Kostadinov | |
| 7,054,793 B2 | 5/2006 | Moritz et al. | |
| 7,076,312 B2 * | 7/2006 | Law et al. | 700/23 |
| 7,080,366 B2 | 7/2006 | Kramskoy et al. | |
| 7,086,009 B2 | 8/2006 | Resnick et al. | |
| 7,089,530 B1 | 8/2006 | Dardinski et al. | |
| 7,096,465 B1 * | 8/2006 | Dardinski et al. | 717/178 |
| 7,110,835 B2 | 9/2006 | Blevins et al. | |
| 7,123,974 B1 | 10/2006 | Hamilton | |
| 7,127,460 B2 * | 10/2006 | Nixon et al. | 1/1 |
| 7,142,322 B2 | 11/2006 | Lee | |
| 7,146,231 B2 | 12/2006 | Schleiss et al. | |
| 7,146,408 B1 | 12/2006 | Crater et al. | |
| 7,151,966 B1 | 12/2006 | Baier et al. | |
| 7,158,513 B2 | 1/2007 | Wada et al. | |
| 7,162,510 B2 | 1/2007 | Jammes | |
| 7,177,052 B2 | 2/2007 | Lapstun et al. | |
| 7,199,784 B2 | 4/2007 | Mathiowetz et al. | |
| 7,245,271 B2 | 7/2007 | Nixon et al. | |
| 7,249,330 B2 | 7/2007 | Roesner et al. | |
| 7,272,815 B1 | 9/2007 | Eldridge et al. | |
| 7,275,062 B2 | 9/2007 | Deitz et al. | |
| 7,337,256 B2 | 2/2008 | Korowitz et al. | |
| 7,356,588 B2 | 4/2008 | Stineman, Jr. et al. | |
| 7,486,495 B1 * | 2/2009 | Diederichs et al. | 361/119 |
| 7,502,656 B2 | 3/2009 | Thibault et al. | |
| 7,574,693 B1 | 8/2009 | Kemink | |
| 7,610,354 B2 | 10/2009 | Adams et al. | |
| 7,664,574 B2 | 2/2010 | Imhof et al. | |
| 7,720,944 B2 | 5/2010 | Thibault et al. | |
| 7,739,361 B2 | 6/2010 | Thibault et al. | |
| 7,882,197 B2 | 2/2011 | Thibault et al. | |
| 7,890,927 B2 | 2/2011 | Eldridge et al. | |
| 7,899,070 B2 | 3/2011 | Thibault et al. | |
| 2001/0007133 A1 | 7/2001 | Moriconi et al. | |
| 2001/0007183 A1 | 7/2001 | Weder | |
| 2001/0025307 A1 | 9/2001 | Venkatraman et al. | |
| 2001/0034777 A1 | 10/2001 | Venkatraman et al. | |
| 2001/0034778 A1 | 10/2001 | Venkatraman et al. | |
| 2001/0034779 A1 | 10/2001 | Venkatraman et al. | |
| 2001/0034780 A1 | 10/2001 | Venkatraman et al. | |
| 2001/0034781 A1 | 10/2001 | Venkatraman et al. | |
| 2001/0037489 A1 | 11/2001 | Stripf et al. | |
| 2001/0044836 A1 | 11/2001 | Venkatraman et al. | |
| 2001/0052109 A1 | 12/2001 | Nagashima et al. | |
| 2002/0013629 A1 | 1/2002 | Nixon et al. | |
| 2002/0049865 A1 | 4/2002 | Charnell et al. | |
| 2002/0067370 A1 | 6/2002 | Forney et al. | |
| 2002/0093980 A1 | 7/2002 | Trebes | |
| 2002/0133636 A1 | 9/2002 | Venkatraman et al. | |
| 2002/0150156 A1 | 10/2002 | Calvin | |
| 2002/0165848 A1 | 11/2002 | Rautenbach et al. | |
| 2002/0194393 A1 | 12/2002 | Hrischuk et al. | |
| 2002/0198920 A1 | 12/2002 | Resnick et al. | |
| 2003/0009250 A1 | 1/2003 | Resnick et al. | |
| 2003/0051068 A1 | 3/2003 | Eldridge | |
| 2003/0115238 A1 | 6/2003 | O'Connor et al. | |
| 2003/0167269 A1 | 9/2003 | Gupta | |
| 2003/0200351 A1 | 10/2003 | O'Connor et al. | |
| 2003/0200369 A1 | 10/2003 | Musumeci | |
| 2003/0208558 A1 | 11/2003 | Venkatraman et al. | |
| 2004/0103165 A1 | 5/2004 | Nixon et al. | |
| 2004/0117534 A1 | 6/2004 | Parry et al. | |
| 2004/0181294 A1 * | 9/2004 | Deitz et al. | 700/19 |
| 2004/0221289 A1 | 11/2004 | D'Souza et al. | |
| 2005/0028037 A1 * | 2/2005 | Junk et al. | 714/39 |
| 2005/0138226 A1 | 6/2005 | Tateyama et al. | |
| 2005/0149893 A1 | 7/2005 | Roesner et al. | |
| 2005/0160263 A1 | 7/2005 | Naizhen et al. | |
| 2005/0172258 A1 | 8/2005 | Nixon et al. | |
| 2005/0283730 A1 | 12/2005 | Uyttendaele et al. | |
| 2006/0129724 A1 | 6/2006 | Kostadinov | |
| 2006/0206860 A1 | 9/2006 | Dardinski et al. | |
| 2006/0206866 A1 | 9/2006 | Eldrige et al. | |
| 2006/0212146 A1 | 9/2006 | Johnson et al. | |
| 2007/0006149 A1 | 1/2007 | Resnick et al. | |
| 2007/0019560 A1 | 1/2007 | Brewer et al. | |
| 2007/0061786 A1 | 3/2007 | Zhou et al. | |
| 2007/0083552 A1 | 4/2007 | Allen et al. | |
| 2007/0110835 A1 | 5/2007 | Maes et al. | |
| 2007/0118805 A1 | 5/2007 | Kraus et al. | |
| 2007/0244571 A1 | 10/2007 | Wilson et al. | |
| 2007/0265089 A1 | 11/2007 | Robarts et al. | |
| 2008/0040477 A1 | 2/2008 | Johnson et al. | |
| 2008/0046598 A1 | 2/2008 | Johnson et al. | |
| 2008/0052386 A1 | 2/2008 | Johnson et al. | |
| 2008/0119951 A1 | 5/2008 | Thibault et al. | |
| 2008/0120367 A1 | 5/2008 | Thibault et al. | |
| 2008/0126500 A1 | 5/2008 | Thibault et al. | |
| 2008/0133700 A1 | 6/2008 | Thibault et al. | |
| 2008/0134215 A1 | 6/2008 | Thibault et al. | |
| 2008/0148170 A1 | 6/2008 | Thibault et al. | |
| 2008/0216169 A1 | 9/2008 | Naizhen et al. | |
| 2008/0222276 A1 | 9/2008 | Thibault et al. | |
| 2009/0094326 A1 | 4/2009 | Thibault et al. | |
| 2009/0118845 A1 | 5/2009 | Eldridge et al. | |
| 2009/0118846 A1 | 5/2009 | Eldridge et al. | |

| | | | |
|---|---|---|---|
| 2009/0125128 | A1 | 5/2009 | Eldridge et al. |
| 2009/0125129 | A1 | 5/2009 | Eldridge et al. |
| 2009/0125130 | A1 | 5/2009 | Eldridge et al. |
| 2009/0125131 | A1 | 5/2009 | Eldridge et al. |
| 2009/0132996 | A1 | 5/2009 | Eldridge et al. |
| 2009/0164031 | A1* | 6/2009 | Johnson et al. ................. 700/89 |
| 2009/0193347 | A1 | 7/2009 | Takahashi et al. |
| 2009/0241086 | A1 | 9/2009 | Saito et al. |
| 2009/0259751 | A1 | 10/2009 | Thibault et al. |
| 2009/0319058 | A1 | 12/2009 | Rovaglio et al. |
| 2010/0005425 | A1 | 1/2010 | Kodosky et al. |
| 2010/0011127 | A1 | 1/2010 | Johnson et al. |
| 2010/0011311 | A1* | 1/2010 | Kodosky et al. ............. 715/771 |
| 2010/0076604 | A1 | 3/2010 | Johnson et al. |
| 2010/0121999 | A1 | 5/2010 | Isenmann et al. |
| 2010/0131084 | A1 | 5/2010 | Van Camp |
| 2010/0222902 | A1 | 9/2010 | Eldridge et al. |
| 2010/0223593 | A1 | 9/2010 | Eldridge et al. |
| 2010/0305720 | A1 | 12/2010 | Doll et al. |
| 2010/0305721 | A1 | 12/2010 | Kostadinov et al. |
| 2011/0040390 | A1 | 2/2011 | Blevins et al. |
| 2011/0093098 | A1 | 4/2011 | Kostadinov et al. |

FOREIGN PATENT DOCUMENTS

| | | |
|---|---|---|
| EP | 0640905 | 3/1995 |
| EP | 0660231 | 6/1995 |
| EP | 1006691 | 6/2000 |
| JP | 02159526 A | 6/1990 |
| JP | 09033647 A | 2/1997 |
| JP | 10019655 A | 1/1998 |
| JP | 11143511 A | 5/1999 |
| WO | WO-9114324 | 9/1991 |
| WO | WO-9504314 A1 | 2/1995 |
| WO | WO-9623377 A1 | 8/1996 |
| WO | WO-96/31047 A2 | 10/1996 |
| WO | WO-9707486 A1 | 2/1997 |
| WO | WO-9726587 A1 | 7/1997 |
| WO | WO-9820649 A1 | 5/1998 |
| WO | WO-9829804 A1 | 7/1998 |
| WO | WO-9836518 A2 | 8/1998 |
| WO | WO-9854843 A1 | 12/1998 |
| WO | WO-0077592 A2 | 12/2000 |
| WO | WO-03039098 A2 | 5/2003 |
| WO | 2010138412 A1 | 12/2010 |

OTHER PUBLICATIONS

U.S. Appl. No. 11/260,859, filed Oct. 28, 2005, Keyghobad et al.
"1995 World Batch Forum: Meeting of the Minds [Agenda]," (May 22-24, 1995) Newtown Square, Pennsylvania, (2 pages).
"A sensation in supervisory control," Manufacturing Systems (Windows NT in manufacturing Supplement), Oct. 1996, pp. 12A-24A.
"AC I/O Modules Available for Low-Cost Automation Controller," New Release, Control Technology Corporation, Jun. 28, 1989 (DialogWeb search result) (1 page).
"Agenda," ISA/SP50-1988-180, ISA Draft, May 3-5, 1988.
"Agenda," World Batch Forum 1994 (Mar. 6-9, 1994), Tempe, AZ, (9 pages).
"Apacs Control System," Power vol. 139, No. 6 (Jun. 1995) p. 81 (Dialog print-out).
"Application of PRIAM Model to Safety Systems on Offshore Oil/Gas Platforms," Silvertech Ltd., Jan. 9, 1995.
"At Interop, Will ToasterNet Be on the Hot List?" Data Communications, vol. 19, No. 13, Oct. 1990, p. 214.
"Automation Controller accepts Customization," News Release, Control Technology, Jul. 12, 1985, (DialogWeb search result).
"Automation Controller features fast 80186 Processor, Integrated Software," News Release, Control Technology (US), Apr. 22, 1986, (DialogWeb search result).
"Automation Programming Environment runs on IBM (R)-PC," News Release, Control Technology (US), Mar. 29, 1988, (DialogWeb search result).
"Automation System Monitors, Controls Fab HVAC, Other Systems," Microcontamination (Aug. 1994).
"Background Info on Mercury Project," (no date available).
"Breaking News for Invensys Software Systems Employees: iBaan and FactorySuite 2000 Integration Announced," internal e-mail dated Mar. 23, 2001.
"Briefs," Network World, May 29, 1995, p. 19.
"bsy's List of Internet Accessible Coke Machines," web page printout (Feb. 12, 1999) from http://www-cse.ucsd.edu/users/bsy/coke.html (1 page).
"CAD/CAM Software creates Automation 'Programming Environment'," News Release, Control Technology (US), Oct. 3, 1988, (DialogWeb search result).
"CMU SCS Coke Machine: Current Status," web page print-out (Feb. 12, 1999) from http://www.cs.cmu.edu/.about.coke/ (1 page).
"Compact System Combines Motion Control, Machine Control," News Release, Control Technology, May 28, 1985, (DialogWeb search result).
"Company Profiles: What Users Need," Power vol. 139 No. 6 (Jun. 1995) p. 81.
"Control System Features Plug-and-Play Technology, Scalability," Chemical Processing (May 1996), p. 33.
"Control system," Power vol. 139, No. 4 (Apr. 1995) p. 114 (Dialog print-out).
"ControlShell Version 5.1 User's Manual," Real-Time Innovations, Jun. 1996, whole manual.
"ControlShell Version 6.0 User's Manual," Real-Time Innovations, Jan. 1999, whole manual.
"DeltaV(tm) System: We Do Smart Plants." Brochure issued by Fisher-Rosemount Systems (1998).
"DeltaV.TM. System Overview: Do More." Brochure issued by Fisher-Rosemount Systems (1998).
"Disk Drive with Embedded Hyper-Text Markup Language Server," IBM TDB, vol. 38, n. 12, Dec. 1995, pp. 479-480.
"Dual-Axis Servo Module for Small Controller," News Release, Control Technology (US), Sep. 11, 1990, (DialogWeb search result).
"Editors' Product Picks," Chemical Processing (May 1996), p. 34.
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.
"ErgoTech upgrades ErgoCim; first 'plug and play' component software for manufacturing," Business Wire, Feb. 15, 1996.
"Fisher-Rosemount Is: Managing the Process Better," Fisher Controls International, Inc. and Rosemount Inc. 1993, (19 pages).
"Gensym Announces Its Initiative for Leveraging Intelligent Systems with Internet/Intranet Technology," Business Wire, Oct. 7, 1997.
"Gensym introduces G2 WebMiner for accessing and reasoning about data from the World Wide Web," Business Wire, May 15, 1996.
"Gensym introduces Internet connectivity for its G2 family of intelligent real-time software," Business Wire, Mar. 18, 1996.
"I/A Series Model 51 FoxRemote II Installation and Configuration Guide," Apr. 8, 1998 (Preliminary), pp. i-iv, 1-2.
"Industries Fashion NASA Products Into Commercial Work", Anne Eisele, Space News, v9, n14, p14, Apr. 6, 1998, 1 page.
"Industry's top embedded operating software supports Java; pSOSystem enables Embedded Internet applications and Low-cost Internet appliances," Business Wire, Feb. 1, 1996.
"Inexpensive Automation Controller features Message Display Capability," News Release, Control Technology (US), May 19, 1989, (DialogWeb search result).
"Information technology in manufacturing," Manufacturing Systems, vol. 14, No. 12, Dec. 1996, pp. 54-78.
"Innovative Small Controller Family offers Full Integration," News Release, Control Technology, Aug. 17, 1989, (DialogWeb search result).
"Integrated Systems; Industry's top embedded operating software supports Java," M2 Presswire, Mar. 4, 1996.
"Intel, SunDisk offerings narrow flash focus," Electronic Engineering Times, p. 10, Oct. 24, 1994.
"Internet windows to the world," New Media Age, Oct. 26, 1995, p. 4.
"Introducing Bailey Evolution 90TM . . . The sound investment strategy for process automation," Bailey 1990 (brochure).
"Jim Henry's 1996 ASEE Paper," web page print-out from http://chem.engr.utc.edu/Documents/ASEE-96-full.html (5 pages).
"Linear Actuators offer Plug-Compatibility with Controller," News Release, Control Technology (US), Nov. 21, 1985, (DialogWeb search result).

"Low-Cost Automation Controller features Motion Control, Communications," News Release, Control Technology (US), Mar. 7, 1988, (DialogWeb search result).
"Make Your Automation Plan a Reality: MAX1000," Leeds & Northrup Technical Overview, (approximately 1990).
"Mitsubishi licenses Sun's Java tool," Electronic Engineering Times (Dec. 11, 1995) p. 29.
"Modular Valve Assemblies Connect to Controller with Ribbon Cable," New Product Release, Control Technology (US), Jan. 8, 1986, (DialogWeb search result).
"Multi-Tasking Controller provides High-level Instructions for Motion Control, Sequencing," News Release, Control Technology Corporation, Aug. 22, 1986, (DialogWeb search result).
"NCR Fieldbus Slave Controller Advance Information," ISA-SP50-1988-161, ISA Draft.
"New at IPC/92! Ethernet link provides Global PLC Registers," News Release, Control Technology (US), Nov. 20, 1992, (DialogWeb search result).
"New at IPC/92! High-Capacity Integrated Motion Controller," News Release, Control Technology (US) Nov. 20, 1992, (DialogWeb search result).
"New Equipment/Literature," Control System vol. 139, No. 4 (Apr. 1995), p. 114.
"New Open Architecture Group Works on Control Standards," Control Engineering Online (Aug. 1997).
"New Products Provide Interactive Graphics Over Web Using Netscape Plug-Ins and Java," PR Newswire, May 20, 1996.
"New Small Automation Controller features Precision Analog I/O Modules," News Release, Control Technology (US), May 30, 1989, (DialogWeb search result).
"New State-Logic Microcontroller," News Release, Control Technology Corp., Jun. 1, 1996 (DialogWeb search result).
"New Telemecanique Programmable Controllers Feature Multiple Programming Languages," (Feb. 11, 1985).
"On-Line Vending Machine and Catalog Product Icons," IBM TDB, v. 38, n. 4 (Apr. 1995), pp. 113-116.
"Operator's Console creates Friendly Machines," News Release, Control Technology (US), May 19, 1986, (DialogWeb search result).
"Operator's Console for Automated Machines," News Release, Control Technology, Aug. 15, 1985, (DialogWeb search result).
"Peter Beebee's Home Page" web page print-out (Feb. 12, 1999) from http://www-swiss.ai.mit.edu/htbin/ptbbgated/jwz/?fetch+personal%2Fmain.text.html (2 pages).
"Pipeline: Announced," InfoWorld, May 29, 1995, p. 45.
"Plant Operations Framework," AMR Report (May/Jun. 1995), (6 pages).
"Plug-Compatible Controls and Actuators Speed System Development," News Release, Control Technology (US), Jan. 13, 1986, (DialogWeb search result).
"Policy Manual," 1994 World Batch Forum (Mar. 6-9, 1994), (15 pages).
"Process Manager Specification and Technical Data," UC03-300 Sep. 1991 Honeywell, copyright 1990 (43 pages).
"Programmable Controller offers control of Stepping and Servo Motors," News Release, Control Technology, May 31, 1985, (DialogWeb search result).
"Radio Field Bus," ISA/SP50-1988-184, ISA Draft.
"Real-Time Innovations Email NewsLetter," Apr. 1998, http://www.rti.com/corporate/newsletter04-98, 2 pages.
"Ricoh to sell world's first multimedia still camera," Japan Economic Newswire, Feb. 21, 1995.
"RTI Announces Major New Component-Based Programming System for Building Complex Electromechanical Systems", PR Newswire, Mar. 16, 1998, 3 pages.
"SDRD Using 1553B Data Link Services," ISA/SP50-1988-243 (1988).
"SECS-11 Communication Board Plugs into Automation Controller," News Release, Control Technology, Aug. 26, 1985, (DialogWeb search result).
"Signal Conditioners Designed for Fisher-Rosemount System Delta V," issued by M-Systems Co., Ltd. (Dec. 1997).
"Small Multi-Tasking Controller for Cost-sensitive Aplications," News Release, Control Technology US, Nov. 8, 1988, (DialogWeb search result).
"SP88 Mes Task-Force Europe Position Document," 1994 World Batch Forum (Mar. 6-9, 1994), (pp. 1-30).
"Special Topic: PC-Based Control," A Supplement to Software Strategies, pp. 3-5, 7-8, 10-15, 20-21 (no date available).
"Suggested Outline for Application Sub-committee Document: Fieldbus Architecture Subcommittee Document," ISA/SP50-1988-175, ISA Draft. (1988).
"Sun announces availability of Javatm Embedded Server 1.0," Press Release dated Oct. 1, 1998, downloaded from java.sun.com website.
"System Provides Stepping Motor Control in Workcell Environment," News Release, Control Technology Corp., Dec. 5, 1986, (DialogWeb search result).
"TDC 3000 Overview," Honeywell, (approximately 1992).
"TDC 3000 Process Manager.TM.: Process Connected Solutions for the Advanced Controls Requirements of the 1990s," Honeywell, (approximately 1992).
"The 'Only' Coke Machine on the Internet," web page print-out (Feb. 12, 1999) from http://www.cs.cmu.edu/.about.coke/history_long.txt (3 pages).
"The Object Primer", Scott Ambler, pp. 1-248. Jan. 4, 1996.
"The Switzerland Coke Machine Credits," web page print-out (Feb. 12, 1999) from http://www-swiss.ai.mit.edu/htbin/coke/ (1 page).
"Toshiba Integrated Control System," Technical Manual Third Edition (Nov. 1990).
"Tour an actual TribeLink via WebManage," web page print-out from http://www.tribe.com/products/webmanage/quick_view.htm (printed on Jul. 12, 1999) (1 page).
"Tribe Announces Revolutionary Use of the Internet; Launches Innovative Remote Management Solution; New WebManage Technology Provides Network Management via World Wide Web," Business Wire, May 22, 1995.
"Tribe Computer Works' Net Products Can be Managed via World Wide Web," IAC (SM) Newsletter Database.TM., DataTrends Publications, Inc., No. 11, vol. 7, May 30, 1995.
"Tribe Launches First Networking Device Capable of Being Managed via Internet Web Browser; TribeLink2 Enables Remote Computing and Internet Access," Business Wire, May 22, 1995.
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeStar," web page print-out from http://www.tribe.com/products/tribestar/index.htm (3 pages) (copyright 1996).
"UDC 6000 Process Controller: From Stand-alone Control to Full System Integration Honeywell Has a Solution for You," Honeywell, (Aug. 1992).
"User Layer Structure," SP-50 Technical Report (Jul. 25, 1990).
"User Layer Technical Report," ISA/SP-50 1990-389C, ISA Draft.
"Wide-range, Fully Compatible Family of Process Automation & Management Systems," Copyright 1993 by Elsag Bailey Group as an Unpublished Work, (24 pages).
"Wizards wheel over SCADA systems; Supervisory Control and Data Acquisition," Control and Instrumentation, No. 12, vol. 28, Dec. 1996, p. 23.
"WWWF'94: Papers Received," web page print-out (Apr. 7, 2000) from http://www.ncsa.uiuc.edu/SDG/IT94/Agenda/Papers-received.html (8 pages).
Adler, David J. et al. "Does a Manufacturing Execution System Reduce the Cost of Production for Bulk Pharmaceuticals?" 1995 World Batch Forum (May 22-24, 1995), (13 pages).
Andrews, "15 MB in a Matchbook" (Jan. 1995) http://www.byte.com/art/9501/sec4/art5.htm.
ANSI/ASME PTC 19.1-1985, "Part 1—Measurement Uncertainty", Apr. 30, 1986, entire document.
Ash, Raymond H. et al. "Strategic Needs in Batch Manufacturing," 1995 World Batch Forum (May 22-24, 1995), (8 pages).
Bader, F. P. "Building a Better Batch Control Foundation with IEC 1131-3 Control Languages," 1994 World Batch Forum (Mar. 6-9, 1994), (23 pages).

Batch Control. Part I: Models and Terminology. (Approved Feb. 28, 1995) ISA-S88.01 1995, pp. 1-128.
Baxter, Richard V., Jr. "Implementing Open Networking in a Motor Drive," The Imbedded Internet Workshop Real World Applications Session (Oct. 1, 1999) San Jose, CA.
Beestermoller, H.J., et al. "An Online and offline programmable Multi-Loop Controller for Distributed Systems," IEEE (1994), pp. 15-20.
Benkhallat, Yazid, et al. "Interoperability of sensors and distributed systems," Sensors and Actuators A vol. 37-38 (1993), 247-254.
Benner, Stephen J. "MES in Batch Process Manufacturing. A MES Vendor view" 1995 World Batch Forum (May 22-24, 1995), (8 pages).
Berge, Jonas, "Using Ethernet is a no-brainer," In Tech: The International Journal for Measurement and Control, pp. 36-39, Jul. 2000.
Bernard, Viki, "Remote-access ware emerge: Shiva, Nortel, and Tribe leading list of innovators," PCWeek, No. 21, vol. 12, May 29, 1995, p. 47.
Berre, A., "Sharing of Objects in an Object-Oriented Language," Proceedings on the 1986 International Workshop on Object-Oriented Database Systems, IEEE Computer Society Press, Los Alamitos, CA, 1986.
Bishop, Brian. "Realtime System-Design Tool Models Electromechanical Systems", , Personal Eng & Instrumentation News, v15, n4, p. 21, Apr. 1998.
Bristol, E H., "Not a Batch Language; A Control Language!" 1995 World Batch Forum (May 22-24, 1995), (14 pages).
Brown, Jerry et al. "Meeting the Challenge of Automation Technology," 1996 World Batch Forum (May 22-24, 1995), (11 pages).
Brown, Jerry et al. "Trends and Opportunities in Batch Control System Architectures," 1994 World Batch Forum (Mar. 6-9, 1994), (pp. 1-12).
Browne, Malcolme W. "South Pole Ready for Internet Revolution," The New York Times, Section C, col. 1, p. 1, Jan. 10, 1995.
Brunn, P. "Collision Avoidance for Two Robots Sharing a Common Workspace," (1995) The Institution of Electrical Engineers.
Bullotta, Rick. "Designing Effective User Interfaces for Batch Processes," 1994 World Batch Forum (Mar. 6-9, 1994), (pp. 1-19).
Burton, P.I. "A personal history of batch control," Measurement + Control vol. 27 (Apr. 1994), pp. 69-73.
Burton, P.I., et al. "Field Bus Based on MIL-STD-1553B: Proposal to ISA-SP-50" ERA Technology Ltd. (Apr. 6, 1988) ISA/SP50-1988-148.
Capetta, L., et al. "From Current Actuators and Transmitters Towards Intelligent Actuation and Measurement: PRIAM Approach," BIAS 93, Milan, Italy 1993.
Caro, Richard H. "Field Bus Applications," ISA (1989) Paper #89/0569, pp. 989-994.
Caro, Richard H. "The Fifth Generation Process Control Architecture," ISA Transactions vol. 28 No. 4 (1989), pp. 23-28.
Chettle, Tim. "Multiplexing techniques optimise data collection," Electrotechnology (Oct./Nov. 1995).
Choi, K.J. et al., "A Modeling Method of Software Configuration Change Control," 1997, IEEE Online, "htttp:ieeexplorer.ieee.org/stamp/stamp.jsp?tp=&arnumber=619990&userType=inst".
Cisco Systems, Inc., "Cisco Secure Wireless Plant: Security and Quality of Service for Industrial Environments," Copyright 1992-2008.
Coleman, Vernon. "National Electrical Manufacturers Association Field Bus Report to ISA SP50," (Oct. 1988) ISA/SP50-1988-234.
Computer Products "Unbundling the DCS" (approximately 1992).
Conradi, R. et al., "Version Models for Software Configuration Management," Jun. 1998, ACM Computing Surveys, vol. 30, No. 2.
Control Technology Corp. News Releases, pp. 1-23, No Date Available.
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages), 1994.
Craig, Lynn W. "SP-88 Defines Batch Control," INTECH Mar. 1994, pp. 34-37.
Crowder, R. S. "A Communication Architecture for Automation & Control," ISA, pp. 669-673. (No date available).

Crowder, R. S. "Generic Data Link Transactions for Simple Devices," Proposal to ISA SP 50 & IEC/SC65C/WG6 (Oct. 15, 1988) ISA Document.
Crowley-Milling, et al, eds. "Proceedings," 1995 International Conference on Accelerator and Large Experimental Physics Control Systems, Chicago, IL Oct. 30-Nov. 3, 1995, [cover pages].
Delahostria. Communication Model Application Layer. (Oct. 14, 1988) ISA/SP50-1988 247, ISA Draft.
Delfino, B. and Pinceti, P. "Fieldbus Applications for Electrical Industrial Systems," IEEE (1993), pp. 2084-2090.
Demetratekes, Pam. "Go with the info flow; state-of-the-art automation in the food industry; includes related article on computer software for food processors," Food Processing, vol. 57, No. 7, Jul. 1996, p. 47.
Distributed Engineering, Institute of Computer-Aided Circuit Design-Test and Test Systems Division, University of Erlangen-Nurnberg, Germany, web page print-out (8 pages) (Oct. 1994).
Dryden, Patrick, "Tribes WebManage Enables Remote Fixes," ComputerWorld, May 22, 1995, p. 14.
Duffey, C.K., et al. "High-Level Control Language Customizes Application Programs," IEEE Computer Applications in Power (1991), pp. 15-18.
Editing Committee Draft Application Layer, Version 12, Oct. 1991.
Editing Committee Draft Application Layer, Version 6, Dec. 1990.
Editing Committee Draft Application Layer, Version 8, May 1991.
Elmer-Dewitt, Philip, "Snowballs in Cyberspace; With a modem and a soldering iron, you too can build an Internet site that is really cool and totally useless," Time, Jan. 16, 1995, p. 57.
ElRakabawy, et al., "Peer-to_Peer File Transfer in Wireless Mesh Networks," University of Leipzig, Copyright 2007 (incl. English Abstract).
Esprit Project 8244, "User Requirements for Intelligent Transmitters and Actuators," European Intelligent Actuation and Measurement User Group, Nov. 24, 1995.
European Office Action, EP Application No. 97305187.3, dated Sep. 22, 2010.
Excerpt from the website of the Society of Manufacturing Engineers (SME)-CyberCut: A World Wide Web Based Design-to-Fabrication Tool, dated Sep. 16, 2010.
Feiler, P., "Software Process Support Through Software Configuration Management," Oct. 1990, Proceedings of the 5th International Software Process Workshop on Experience with Software Process Models, IEEE Computer Society Press.
Ferraiolo et al., A Role-Based Access Control Model and Reference Implementation Whinin a Corporate Intranet, ACM, Feb. 1999.
Fieldbus Inc. "The Foundationä fieldbus Primer," Revision 1.1, Released Jun. 24, 2001, 36 pages.
Fieldbus Standard for Use in Industrial Control Systems. Part 2: Physical Layer Specification and Service Definition. (1992) ANSI/ISA-S50.02.
Fisher, Thomas G P.E. "SP88 Update-Now and the Future," 1995 World Batch Forum (May 22-24, 1995), (59 pages).
Foster, Kirsten. "surf's up; lights, camera, but no action; Steve is a Tech-Nomad. He wanders the streets with a camera on his head. And he wants you to join him," The Independent (London), Aug. 13, 1995, p. 10.
Foxboro Fieldbus Proposal (Presented to ISA SP-50 Committee Feb. 24, 1988) ISA/SP50-1988-123B, ISA Draft.
Foxboro, "I/A Series A2TM Software-FoxCTS-Change Tracking Software-Product Specifications," 1997-2003, pp. 1-8.
Foxboro, "I/A Series Software FoxDraw," 1996 (8 pages).
Foxboro, "I/A Series Software-FoxCTSTM—Change Tracking Software-Product Specifications," 1997-2006, pp. 1-12.
Foxboro, "I/A Series-Object Manager Calls—Oct. 31, 1995," pp. 1-124.
Foxboro, "Intelligent Automation Series Human Interface Software", 20 pgs., 1997.
Friscia, Anthony et al. "MES: Manufacturing's Missing Link is a Tool for Change," 1994 World Batch Forum (Mar. 6-9, 1994), (8 pages).
Fuhr et al., "Wireless Technology Review: Radios, Frequencies, and Implications for Industry," Wireless Technology Review, Feb. 2010.

Fulcher, Jim and Dilger, Karen Abramic, "Soft control, Internet spark ISA/96," Manufacturing Systems, vol. 14, No. 12, Dec. 1996, pp. 40-46.

Furness, Harry. "Fieldbus: The Differences Start From the Bottom Up," Control Engineering (Mar. 1994), pp. 75-77.

Gaines, B.R. et al. "Mediator: An Intelligent Information System Supporting the Virtual Manufacturing Enterprise," IEEE .RTM. 1995 (XP 000586326) pp. 964-969.

George J. Thaler, et al., "Automatic Control Systems," pp. 1-60, 1989.

Gertz, Matthew, et al. "A Human-Machine Interface for Distributed Virtual Laboratories," IEEE Robotics & Automation Magazine 1 (1994) Dec. No. 4 (New York) pp. 5-13.

Gillespie, David P., Ph.D. "Comprehensive Information Management: EPA, OSHA, and Beyond," 1995 World Batch Forum (May 22-24, 1995), (14 pages).

Gleick, James. "Fast Forward: Really Remote Control," The New York Times, Section 6, col. 3, p. 42, Dec. 3, 1995.

Goldberg, Ken et al. "Desktop Teleoperation via the World Wide Web," IEEE International Conference on Robotics and Automation, pp. 654-659 (1995).

Goldberg, Ken, et al. "Beyond the Web: Excavating the Real World Via Mosaic," (Conference Paper) The Mercury Project (Oct. 17-21, 1994).

Goldberg, Ken, et al. "Beyond the Web: manipulating the real world," Computer Networks and ISDN Systems 28 (1995) pp. 209-219.

Goldstein, Ira and Hardin, Joseph, "Guest editorial," Computer Networks and ISDN Systems 28 (1995) p. 1.

Goodstein, L.P. et al., "Representation of Process State Structure and Control," Apr. 1987, Riso National Laboratory.

Grant, Dr. R. Peter, "The Impact of Reengineering on the Batch Manufacturing Workplace," 1995 World Batch Forum (May 22-24, 1995), (5 pages).

Greene, Tim. "Sahara puts Java to Management Test," Network World vol. 13, No. 7 (Feb. 12, 1996).

Gutierrez, Jose, "WirelessHART™: The Industrial Wireless Standard," Measurement and Testing, Wireless Technology Focus, Jun./Jul. 2008.

Gyorki, John R. "PLCs drive standard buses," Machine Design (May 11, 1995), pp. 83-90.

HART Communication Foundation Tech Note, "Peer to Peer Communication with WirelessHART," HCF_LIT-129 Rev. 1.0, Sep. 5, 2008.

HART Communication Foundation Tech Note, "Peer to Peer Communication with WirelessHART," HCF_LIT-129 Rev. 1.1, Mar. 5, 2010.

Hart Communication Foundation, "Wireless Hart Overview," Copyright 2009, available at: http://www.hartcomm.org/protocol/wihart/wireless-overview.html.

Hashemian, et al., "In-Situ Response Time Testing of Thermocouples", ISA 1989, Paper #89/0056, pp. 587-593.

Helson, Ron, Hart Field Communications Protocol, "Hart Tutorial: The Benefits of HART Protocol Communication in Smart Instrumentation Systems," (no date available).

Henry, "A Fault-Tolerant Interface for Self-Validating Sensors", Oxford University, Digest No. 1990/145 (Nov. 1990).

Henry, "A New Approach to Sensor Validation", IMC, Mar. 17, 1992.

Henry, "Intelligent Behaviour for Self-Validating Sensors", Advances in Measurement, pp. 1-7, May 1990.

Henry, et al., "A Standard Interface for Self-Validating Sensors", Tech. Rep. 1884/91, OUEL, University of Oxford, Sep. 1991.

Henry, et al., "Implications of Digital Communications on Sensor Validation," Tech. Rep. 1912/92, OUEL, University of Oxford, Apr. 1992.

Henry, et al., "Signal Processing, Data Handling and Communications: The Case for Measurement Validation," Tech. Rep. 1912/92, OUEL, University of Oxford, Mar. 1992.

Henry, Jim, Ph.D., P.E. "Implementation of Practical Control Systems: Problems and Solutions," web page print-out from http://chem.engr.utc.edu/Documents/MACSCITECH/MACSCITECHpaper1.html (printed on Apr. 10, 2001) (22 pages).

Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/ASEE-95-full.html (22 pages).

Hoek, A., Heimbigner, D., and Wolf, A.L.,"A Generic, Peer-to-Peer Repository for Distributed Configuration Management", May 1996, Proceedings of the 18th International Conference on Software Engineering Publisher, IEEE Computer Society.

Holding, David and Wood, Graham. "Communications in microprocessor industrial implementation," Microprocessors and Microsystems vol. 3 No. 10 (Dec. 1979), pp. 443-451.

ICCard Design Sep./Oct. 1995.

International Search Report & Written Opinion, PCT/US09/47901, Mailed Jun. 19, 2009 (11 pages).

Invensys Operations Management, "The Trident's Main Processor and Communication Module Support Modbus, Ethernet, Peer-to-Peerr, and TriStation Protocols," Trident Communication Capabilities, (no date available).

Invensys, "FoxDraw Display Builder and Configurator", 8 pgs., 2004.

IRD Mechanalysis, Inc., "Model 816 Machinery Maintenance Data Collector," 1983, 2 pages.

IRD Mechanalysis, Inc., "Model 817 Machinery Maintenance Data Collector," 1984, 4 pages.

IRD Mechanalysis, Inc., "Model 818 Machinery Maintenance Data Collector," 1985, 6 pages.

Johnson, Dick. "Pressure Sensing Advances: Are They in Your Process' Future?" Control Engineering (Apr. 1995), pp. 67-72.

Johnsson, et al., "High-Level Grafcet and Batch Control", Nov. 1994, Symposium ADPM.

Kelly, D. Mark. "Digital fieldbus cluster cuts plant's wiring costs up to 20%," Intech (Apr. 1995), pp. 62-64.

Kissling, Jeffrey L. "Flexible Software Structure and Change Management," 1995 World Batch Forum (May 22-24, 1995), (16 pages).

Kline, "The Purposes of Uncertainty Analysis", vol. 107, Journal of Fluids Engineering, pp. 153-160 (Jun. 1985).

Ko, Diffu, "Trobe defines net management role for Web browser software," Network World, May 22, 1995, p. 14.

Kohler H. J., et al.,"Integrating UML Diagrams for Production Control Systems," ACM p. 241-251, 2000.

Kostas, et al., "Real-Time Voice Over Packet-Switched Networks", pp. 18-27, IEEE Network (Jan./Feb. 1988).

Koth, H. and Oeder, K. "The Advantages of Intelligent Field Modules for Nuclear Power Plant Operation and Maintenance," Kemtechnik 60 (1996) 5-6, pp. 215-219.

Lenhart, Gerald W. "A Field Bus Approach to Local Control Networks," ISA, Paper #93-281 1993.

Lenhart, Gerald W. "Fieldbus-Based Local Control Networks," INTECH (Aug. 1994), p. 31-34.

Leon, Mark, "Tektronix to add Web software on new printers," InfoWorld, Dec. 4, 1995, p. 6.

Loos, Peter. "Production Management-Linking Business Applications to Process Control," 1995 World Batch Forum (May 22-24, 1995), (pp. 1-16).

Loose, Graham. "Fieldbus—the user's perspective," Measurement + Control vol. 27 (Mar. 1994), pp. 47-51.

Loupos, Konstantinos et al., "VR, HF and Rule-Based Technologies Applied and Combined for Improving Industrial Safety," Lecture Notes in Computer Science, vol. 4555, Universal Access in Human-Computer Interaction, Ambient Interaction, pp. 676-680 (2007).

Lu, S. et al., "An Object-Oriented Power Plant Adaptive Control System Design Tool," Sep. 1995, IEEE Transactions on Energy Conversion, vol. 10, No. 3.

Magnusson, B., Asklund, U., and Minor, S., "Fine-Grained Revision Control for Collaborative Software Development", Dec. 1993, Proceedings of the 1st ACM SIGSOFT Symposium on Foundations of Software Engineering, ACM.

Martin, "Design and Strategy for Distributed Data Processing", Chptrs. 19 & 20, pp. 272-305 (1981).

Maser, K. et al., "Development of a Wireless Global Bridge Evaluation and Monitoring System (WGBEMS)," Building of International Community of Structural Engineers, vol. 2, Proceedings of Structures Congress XIV Apr. 15-18, 1986, American Society of Civil Engineers, Chicago IL, 8 pages.

Meeting Minutes, Ad Hoc Function Block Meeting, Jun. 14, 1990, Chapel Hill, NC (pp. 1-60).
Meeting Minutes, Process Control Working Group of SP50.4, Jan. 21-23, 1991, Atlanta, GA (8 pages).
Meeting Minutes, SP50, International Electrotechnical Commission, Technical Committee No. 65: Industrial-Process Measurement and Control, Sub-Committee 65C: Digital Data Communications for Measurement and Control and Working Group 6: Field BusStandard for Use in Industrial Control Systems, Feb. 28-Mar. 4, 1988, Scottsdale, Arizona (143 pages).
Meeting Minutes, SP50, Signal Compatibility of Electrical Instruments, Dec. 5-7, 1990, Orlando, FL (64 pages).
Meeting Minutes, SP50.4 Application Layer, Oct. 19-21, 1988, Houston, TX (96 pages).
Meeting Minutes, Windows Working Group of Application Subcommittee, Mar. 1-3, 1989, New Orleans, LA (pp. 1-8).
Mirabella, Orazio. "A Short Presentation of IEC Fieldbus Application Layer," Informatics and Communication Institute, Engineering Faculty, University of Catania, Italy, Feb. 14, 1995.
Miyoshi et al., "A Real-Time Java Server for Real-Time Match", 1997, IEEE, pp. 319-325.
Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995.
Morel, G., et al. "Discrete Event Automation Engineering: Outline of the PRIAM Project." BIAS '93, vol. 1, pp. 105-116, MILAN, Nov. 23-25, 1993.
Mori, et al., "The PCMCIA Developer's Guide, Second Edition," Sycard Technology 1994.
Niagara Framework, http://www.tridium.com/products/niagara.asp, Feb. 10, 2005, 2 pages.
NOAH: Network Oriented Application Harmonisation based on General Purpose Field Communication System. Project description rev. 1.0, Oct. 25, 1995. P-NET, PROFIBUS, WorldFIP.
Nobuhiko, Tsuji, et al. "An Advanced Optical Fieldbus Instrumentation System Using 16×16 Reflection Type Optical Star Coupler and Low Powered Transmitter," pp. 755-764, (1995).
Notte, Angelo J. "Multitasking Capability Simplifies Process Control Design" Reliance Electric Company, approximately late 1980s.
Object-Oriented Information Systems Planning and Implementation, David A. Taylor, Wiley Professional Computing, published Apr. 10, 1992, pp. 1-357.
Ochoa, David. "Effects of Alliances and Acquisitions on the Batch Automation User," 1995 World Batch Forum (May 22-24, 1995), (43 pages).
Office Action mailed Dec. 26, 2002, U.S. Appl. No. 09/379,074.
Office Action mailed Feb. 1, 2008, U.S. Appl. No. 10/765,006.
Office Action mailed Apr. 23, 2002, U.S. Appl. No. 09/379,074.
Office Action mailed Jul. 2, 2007, U.S. Appl. No. 10/765,006.
Office Action mailed Sep. 24, 2003, U.S. Appl. No. 09/379,074.
Output to Valve, Revision No. 1.4, Jan. 18, 1991, (Draft Document), Instrument Society of America.
Owen, S., et al. "A modular reconfigurable approach to the creation of flexible manufacturing cells for educational purposes," Fast Reconfiguration of Robotic and Automation Resources (Colloquium) Oct. 20, 1995, The Institution of ElectricalEngineers.
Pace, Hugh W. "Valve Actuators Ready for Fieldbus," Control Engineer (Oct. 1995), pp. 65-73.
Pages from Aspentech.com website as of Jan. 1997, retrieved from Internet archive http://web.archive.org.
Pages from Aspentech.com website as of Oct. 1996, retrieved from Internet archive http://web.archive.org.
Pages from SL.com website as of Apr. 1999, retrieved from Internet archive http://web.archive.org.
Pages from SL.com website as of Dec. 1998, retrieved from Internet archive http://web.archive.org.
Pages from SL.com website as of Feb. 1997, retrieved from Internet archive http://web.archive.org.
Pages from SL.com website as of May 2000, retrieved from Internet archive http://web.archive.org.
Pappalardo, Denise, "Digi Introduces IP/IPX Router," InternetWeek, Apr. 24, 1995, p. 15.
Pappalardo, Denise, "Router Can Be Managed via Net," InternetWeek, May 22, 1995, p. 6.
Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.
Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.
Phinney, Thomas L. "An Analysis of Contending Proposals in ISA SP-50 for an ISA/IEC Field Instrument Bus," ISA (1988) Paper #88/1489.
Pinto, Jim. "The Great Fieldbus Debate—is Over," Action Instruments (www.actionio.com) (originally published in Industrial Controls Intelligence, Nov. 1999).
Preface: Field Bus Process Control User Layer Technical Support, Feb. 28, 1991.
Press Release from Real-Time Innovation announcing ControlShell version 6.0 for sale/for use, Apr. 1998, 2 pages.
Product Specification, I/A Series.RTM. RBATCH II, Aug. 31, 1994 (Revised Apr. 1995).
Product Specifications, I/A Series(R) Software FoxGuard(TM) Manager for Triconex(TM) Safety Systems, Copyright 2000-2006, Invensys Systems, Inc.
PROWAY-LAN Industrial Data Highway. (Approved Feb. 3, 1986) ISA-S72.01-1985.
Redman, Jun, et al. "Intranet and the internal Web server: A standard user interface for integrating manufacturing applicaitons,"Proceedings of the Industrial Comuting conference, vol. 6, No. 1 (1996).
Reklaitis, G. V. "Scheduling Approaches for the Batch Process Industries," 1995 World Batch Forum (May 22-24, 1995), (17 pages).
Renu Electronics Pvt. Ltd., "GWY-800 (HART Gateway) User Manual," Rev. 0, Jul. 13, 2006.
Report from IEC TC65 Working Group 6 Function Blocks, May 1, 1995.
Robinson, D. et al., "Modelling and Synthesis of Configuration Controllers for Dynamically Reconfigurable Logic Systems Using the DCS CAD Framework," 1999, Field-Programmable Logic and Applications, FPL '99, pp. 41-50.
Rodriguez, Karen, "Tribe sets software," Interactive Age, vol. 2, No. 15, May 22, 1995, p. 25.
Rosenof, Howard P. "Dynamic Scheduling for a Brewery," 1995 World Batch Forum (May 22-24, 1995), (6 pages).
Scharf, Ronald, et al, "Using Mosaic for Remote Test System Control Supports Distributed Engineering," Institute of Computer-Aided Circuit Design—Test and Testsystems Division, University of Erlangen-Nurnberg, Germany, web page print-out fromhttp://www.ncsa.uiuc.edu/SDG/IT94/Proceedings/CSCW/scharf/scharf.html (8 pages), 1994.
Schreiber Philip et al. "Process Automation Using SP88," 1995 World Batch Forum (May 22-24, 1995), (7 pages).
Schuur, C. "Comments on Analysis and Suggestions for ISA-SP50 as submitted to the SP50 Committee by Honeywell Inc." (Mar. 11, 1988) ISA-SP50-1988-155, ISA Draft.
Schuur, Chris and Warrior, Jay. "Phillips Token Passing Field Bus Controller Timed Token Mode," ISA/SP50-1988-186, ISA Draft. (1988).
Silverman, Dwight. "'Attaboy' for the best software and hardware of 1994," The Houston Chronicle, Dec. 25, 1994, p. 2.
Skabowski, E. L. "Recommendations for Consideration at Oct. 1988 Application Layer Subcommittee Meeting," (Oct. 3, 1988).
Slater, A. F. "Controlled by the Web," Computer Networks and ISDN Systems 27 (1994) pp. 289-295.
Smith, Chris. "Tektronix Pushes Ease-of-Use and Low Cost of Operation With Its New Phaser.RTM. Color Laser Printer," comp.newprod forum (Jan. 11, 1996).
Smith, S. et al., "Cyber Cut: A world wide web based design-to fabrication tool", Journal of Manufacturing Systems, vol. 15/No. 6, Jan. 1, 1996, pp. 432-442.
SNAP Foundation Template "Using the SNAP Development Environment," Version 8.0, Chapters 1-4, 1997.
Solvie, Michael J. "Configuration of Distributed Time-Critical Fieldbus Systems," IEEE (1994), p. 211.

Song, Jianping et al., "Challenges of Wireless Control in Process Industry," Workshop on Research Directions for Security and Networking in Critical Real-Time and Embedded Systems, Apr. 4, 2006, San Jose, CA, USA; available at http://moss.csc.ncsu.edu/~mueller/crtes06.

Soreide, N. N., et al. "Mosaic access to real-time data from the TOGA-TAO array of moored buoys," Computer Networks and ISDN Systems 28 (1995), pp. 189-197.

Stapleton, Nick. "802.3 Working Group DTE Power via MDI Call for interest," 3Com (Jul. 1999), (15 pages).

Stein, R. et al. "Development of a Commercially Successful Wearable Data Collection System," University of CA San Diego, Downloaded Jan. 12, 2009, 7 pages.

Stevens, et al. "TCP/IP Illustrated, vol. 1. The Protocols," TCP/IP Illustrated vol. 1, XP-002106390, pp. 85-96. (1994).

Strack, Bob. "The Hawk is Soaring," Chemical Processing (May 1996) p. 11.

Strobhar, David A. "Evolution of Operator Decision Making," 1995 World Batch Forum (May 22-24, 1995), (6 pages).

Strothman, Jim and Ham, John. "Alliances, Fieldbus, Windows Stir ISA/94 Anaheim Pot," INTECH (Dec. 1994), pp. 32-35.

Strothman, Jim and Ham, John. "ISA/95 New Orleans: 'Open', NT winds (not Opal) blow strong," INTECH (Nov. 1995), pp. 45-48.

Table of Contents, Automation & Technology Department, 1993.

Table of Contents, Automation & Technology Department, 1995.

Table of Contents, Industrial Computing Society Conference ICS/95, New Orleans, LA, Oct. 1-6, 1995.

Table of Contents, ISA '88 International Conference and Exhibit, Houston, TX, Oct. 16-21, 1988.

Table of Contents, ISA '89 International Conference and Exhibit, Philadelphia, PA, Oct. 23, 1989.

Table of Contents, Proceedings of the 20th International Conference on Industrial Electronics Control and Instrumentation, vols. 1-3, Sep. 5-9, 1994, Bologna, Italy.

Table of Contents, Proceedings of the 7th Mediterranean Electrotechnical Conference, vol. 1, Apr. 12-14, 1994, Antalya, Turkey.

Table of Contents, Proceedings of the Industrial Computing Conference, vol. 3, Sep. 19-24, 1993, Chicago, IL. Industrial Computing Society.

Taylor, Ken and Trevelyan, James, "A Telerobot on the World Wide Web," printed from http://telerobot.mech.uwa.edu.au/ROBOT/telerobo.htm (14 pages) (1995).

The Foxboro Company, "FoxCMS Change Management System Software," 48 pgs., Aug. 14, 1996.

Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).

Tinham, Brian, "Getting SCADA by web browsner? Supervisory Control and Data Acquisition," Control and Instrumentation, No. 12, vol. 28, Dec. 1996, p. 5.

Tobin, David. "Southeast Paper Installs Largest Foxboro Distributed Control System." (No date available).

Toner, Mike. "Web's view of world far and wide," The Houston Chronicle, Nov. 5, 1995, p. 6.

Tweney, "Java on Your Mobile Phone?", http://www.business2.com (Mar. 14, 2002).

U.S. Appl. No. 09/573,151, filed May 17, 2000, Linscott, Richard L.

United States Patent and Trademark Office final Office Action for U.S. Appl. No. 11/354,586, mailed Aug. 4, 2009.

United States Patent and Trademark Office final Office Action for U.S. Appl. No. 11/354,586, mailed Jul. 1, 2008.

United States Patent and Trademark Office final Office Action for U.S. Appl. No. 11/781,216, mailed Jan. 8, 2009.

United States Patent and Trademark Office final Office Action for U.S. Appl. No. 11/781,218, mailed Jan. 28, 2009.

United States Patent and Trademark Office final Office Action for U.S. Appl. No. 11/781,219, mailed Nov. 14, 2008.

United States Patent and Trademark Office non-final Office Action for U.S. Appl. No. 11/354,586, mailed Jan. 8, 2009.

United States Patent and Trademark Office non-final Office Action for U.S. Appl. No. 11/354,586, mailed Mar. 6, 2007.

United States Patent and Trademark Office non-final Office Action for U.S. Appl. No. 11/354,586, mailed Nov. 1, 2007.

United States Patent and Trademark Office non-final Office Action for U.S. Appl. No. 11/781,216, mailed Aug. 7, 2008.

United States Patent and Trademark Office non-final Office Action for U.S. Appl. No. 11/781,219, mailed Jul. 14, 2008.

United States Patent and Trademark Office non-final Office Action for U.S. Appl. No. 11/207,816, mailed Apr. 9, 2007.

United States Patent and Trademark Office non-final Office Action for U.S. Appl. No. 11/207,816, mailed Jan. 10, 2008.

United States Patent and Trademark Office non-final Office Action for U.S. Appl. No. 11/207,816, mailed Jul. 3, 2008.

United States Patent and Trademark Office non-final Office Action for U.S. Appl. No. 11/207,816, mailed Oct. 4, 2006.

United States Patent and Trademark Office non-final Office Action for U.S. Appl. No. 11/207,816, mailed Sep. 19, 2007.

United States Patent and Trademark Office non-final Office Action for U.S. Appl. No. 11/781,218, mailed Sep. 15, 2008.

United States Patent and Trademark Office non-final Office Action for U.S. Appl. No. 11/781,219, mailed Jul. 21, 2009.

Van de Pol. "OmniChem: Real Time Production scheduling in a batch oriented environment," 1994 World Batch Forum (Mar. 6-9, 1994), (23 pages).

Vardy, Joel M. "Integrating Manufacturing Into the Corporate Reengineering Effort for the Batch Industries," 1995 World Batch Forum (May 22-24, 1995), (23 pages).

Wang, Lithui et al. "Agent-based Intelligent Control System Design for Real-time Distributed Manufacturing Environments". Agent-basedManufacturing Workshop, Autonomous Agents '98. Minneapolis/St. Paul, May 9-13, 1998, pp. 152-159.

Webb, Marcus. "Computer System Implementation, Batch Standards and Validation," 1995 World Batch Forum (May 22-24, 1995), (11 pages).

Weinert, A., et al. "RT/OS—realtime programming and application environment for the COSY control system," Nuclear Instruments and Methods in Physics Research A vol. 352 (1994), pp. 277-279.

Welch, Nathalie, "Tribe to manage via Web; Tribe Computer Works Inc.'s TribeLink2 Product Announcement," MacWEEK, vol. 9, No. 21, May 22, 1995, p. 18.

WG1 List of Criteria (Appendix 1), (Oct. 21, 1988) ISA/SP50-1988-242, ISA Draft.

Wilder, Clinton, "Network Management: Russing Nets Via The Web—Trib's WebManage uses popular interface," InformationWeek, May 29, 1995, p. 62.

Williams, Gary, "Wireless Plant and Backhaul in the Industrial Environment," Invensys Operations Management, (no date available).

Wolfe, Alexander, "Strong Brew," Electronic Engineering Times, Apr. 8, 1996, p. 73.

Wood, G. G. "Current Fieldbus activities," computer communications vol. 11 (Jun. 1988) No. 3, pp. 118-123.

Wood, G. G. "Evolution of communication standards for the process industry," Measurement + Control vol. 19 (Jul./Aug. 1986), pp. 183-188.

Wood, G. G. "Survey of LANs and Standards," Computer Standards & Interfaces vol. 6 (1987), pp. 27-36.

Wood, G. G. "The Argus Consul System for On-Line Computer Control," Electrical Engineering Transactions (Mar. 1969), pp. 114-118.

Wood, G. G. "The Challenge of Standards for Plant Communication," IFAC Distributed Computer Control Systems (1982), pp. 191-192.

Wood, G. G. "Towards digital information control," Measurement + Control vol. 21 (Jul./Aug. 1988), pp. 179-180.

Wood, Graeme G. "Data Transmission, Processing and Presentation," pp. 46-54 (no date available).

Wood, Graeme, G. "Standardisation Work for Communication Among Distributed Industrial Computer Control Systems—A Status Report," INRIA (1984), pp. 67-69.

Wood, Graeme. "Fieldbus Status 1995," Computing & Control Engineering Journal (Dec. 1995), pp. 251-253.

Wood, Graeme. "Generic Link Transactions for Simple Devices in Fieldbus." ISA/SP50-1988-240 (Sep. 20, 1988).

Young, Stephen L. "Technology . . . The Enabler for Tommorrow's Agile Enterprise," 1995 World Batch Forum (May 22-24, 1995), (10 pages).

Zeff, Joe. "Maui Sunset in Real Time (Modems not Optional)," The New York Times, Nov. 27, 1995, Section D, col. 2, p. 5.

Zeller, A. and Snelting, G., "Unified Versioning Through Feature Logic," Oct. 1997, Transactions on Software Engineering and Methodology, vol. 6, Issue 4, ACM.

Hiertz, Guido et al., "IEEE 802.11s: The WLAN Mesh Standard," IEEE Wireless Communications, pp. 104-111, Feb. 2011.

User Guide for IntelaTrac 2000: Automated Field Data Collection Solutions, Rev. 1.0, Nov. 30, 1999.

* cited by examiner

Process Control System

Exemplary Controlled Process

Exemplary Profibus Segment

Control Strategy Configurator Components

Component Interaction Diagram

METHODS AND APPARATUS FOR CONTROL CONFIGURATION WITH ENHANCED CHANGE-TRACKING

REFERENCE TO RELATED APPLICATIONS

This application is a continuation-in-part of U.S. patent application Ser. No. 12/474,942, filed May 29, 2009 now U.S. Pat. No. 8,127,060, entitled "Methods And Apparatus For Control Configuration With Control Objects That Are Fieldbus Protocol Aware," and U.S. patent application Ser. No. 12/474,885, filed May 29, 2009 now U.S. Pat. No. 8,122,434, entitled "Methods And Apparatus For Control Configuration With Control Objects That Self-Define Tracked. Parameters," the teachings of both of which are incorporated herein by reference.

This application is related to U.S. patent application Ser. No. 12/265,837, filed Nov. 6, 2008, entitled "Apparatus for Control Systems with Objects that Are Associated with Live Data," which is a continuation of U.S. application Ser. No. 12/247,872, filed Oct. 8, 2008 and entitled "CONTROL SYSTEM EDITOR AND METHODS WITH LIVE DATA", which is a continuation of U.S. application Ser. No. 11/434,005, filed May 15, 2006 and entitled "METHOD AND APPARATUS FOR CONTROL CONFIGURATION USING LIVE DATA", which is a continuation of U.S. application Ser. No. 09/572,343, filed May 17, 2000, entitled "METHODS AND APPARATUS FOR CONTROL CONFIGURATION WITH VERSIONING, SECURITY, COMPOSITE BLOCKS, EDIT SELECTION, OBJECT SWAPPING, FORMULAIC VALUES AND OTHER ASPECTS" (now issued as U.S. Pat. No. 7,272,815), which is a continuation of U.S. application Ser. No. 09/448,223, filed. Nov. 23, 1999, entitled "PROCESS CONTROL CONFIGURATION SYSTEM WITH CONNECTION VALIDATION AND CONFIGURATION" (now issued as U.S. Pat. No. 7,089,530) and is a continuation of U.S. application Ser. No. 09/448,374, filed Nov. 23, 1999, entitled "PROCESS CONTROL CONFIGURATION SYSTEM WITH PARAMETERIZED OBJECTS" (now issued as U.S. Pat. No. 7,096,465) and is a continuation of U.S. application Ser. No. 09/448,845, filed Nov. 23, 1999, entitled "METHODS AND APPARATUS FOR CONTROLLING OBJECT APPEARANCE IN A PROCESS CONTROL CONFIGURATION SYSTEM" (now issued as U.S. Pat. No. 6,754,885) and which claims the benefit of priority of U.S. Application Ser. No. 60/134,597, filed May 17, 1999, entitled "INTEGRATED DESIGN AUTOMATION CONTROL STRATEGY CONFIGURATOR ARCHITECTURE"; the teachings of all of the aforementioned applications (including the forms thereof published by the United States Patent and Trademark Office and the patents issued therefrom, including, by way of non-limiting example, U.S. Pat. Nos. 6,754,885, 7,096,465, 7,089,530, 7,272,815), are incorporated herein by reference.

BACKGROUND OF THE INVENTION

The invention relates to process control and, more particularly, to tracking changes in the configuration of process control devices.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor a device, process or system and automatically adjust its operational parameters. In other control systems, such apparatus monitor the device, process or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in utility and other service industries. Environmental control finds application in residential, commercial, institutional and industrial settings, where temperature and other environmental factors must be properly maintained. Control is also used in articles of manufacture, from toasters to aircraft, to monitor and control device operation.

Modern day control systems typically include a combination of field devices, control devices, and controllers, the functions of which may overlap or be combined. Field devices include temperature, flow and other sensors that measure characteristics of the device, process or system being controlled. Control devices include valves, actuators, and the like, that control the device, process or system itself.

Controllers generate settings for the control devices based on measurements from the field devices. Controller operation is typically based on a "control algorithm" that maintains a controlled system at a desired level, or drives it to that level, by minimizing differences between the values measured by the sensors and, for example, a setpoint defined by the operator.

In a food processing plant, for example, a controller can be used to maintain a soup stock at a simmer or low boil. This is done by comparing measurements of vapor pressure in the processing vessel with a desired setpoint. If the vessel pressure is too low, the control algorithm may call for incrementally opening the heating gas valves, thereby, driving the pressure and boiling activity upwards. As the pressure approaches the desired setpoint, the algorithm requires incrementally leveling the valves to maintain the roil of the boil.

Controllers may be networked or otherwise connected to other computing apparatus that facilitate monitoring or administration. The so-called S88 industry standard, described in Batch Control—Part 1: Models and Terminology (The International Society for Measurement and Control 1995), for example, defines a hierarchy of processing and control equipment ("equipment entities") that can be used to model and control an automated manufacturing process. At the lowest level of the hierarchy are control modules that directly manipulate field devices (e.g., opening and closing valves) and, possibly, other control modules. At a higher level, equipment modules coordinate the functions control modules, as well as of other equipment modules, and may execute phases of the manufacturing process (such as setting controller constants and modes). "Units," at still a higher level of the hierarchy, coordinate the functions of equipment and control modules. Process cells orchestrate all processing activities required to produce a manufacturing batch, e.g., scheduling, preparing and monitoring equipment or resources, and so forth.

The principal function of controllers is executing control algorithms for the real-time monitoring and control of devices, processes or systems. They typically have neither the computing power nor user interfaces required to facilitate the design of a control algorithm. Instead, the art has developed configurators. These are typically general purpose computers (e.g., workstations) running software that permit an engineer or operator to graphically model a device, process or system and the desired strategy for controlling it. This includes enumerating field devices, control devices, controllers and other apparatus that will be used for control, specifying their interrelationships and the information that will be transferred among them, as well as detailing the calculations and methodology they will apply for purposes of control. Once modeling is complete and tested, the control algorithm is downloaded to the controllers.

One well known process control system configurator is that provided with the I/A Series® (hereinafter, "IAS" or "I/A") systems, marketed by the assignee hereof. These provide a graphical interface (FoxCAE) permitting an engineer to model a process hierarchically and to define a control algorithm from that hierarchy. Multiple editors are provided for defining and modifying modules within the hierarchy. A change management system, FoxCMS®, also marketed by the assignee hereof, provides for logging of configuration changes downloaded to controllers by the I/A Series system.

Though prior art process control configuration systems, particularly, the IAS systems and others sold by the assignee hereof, have met wide acceptance in the industry, there remains room for improvement. Such is the case, for example, with respect to the configuration of complex control systems, as well as with the tracking of changes to the configurations of those systems.

In this context, an object of the present invention is to provide improved methods and apparatus for control and, particularly, for tracking changes to configurations of control systems.

A further object of the invention is to provide such methods and apparatus as facilitate tracking changes made outside traditional process control model configurators.

Still yet a further object of the invention is to provide such methods and apparatus as can be used with a range control systems, whether pertaining to process, environmental, manufacturing, industrial or other such control or otherwise.

SUMMARY OF THE INVENTION

The foregoing are among the objects attained by the invention, which provides, in one aspect, a process, environmental, manufacturing, industrial or other such control system (hereinafter, "control system") with enhanced change tracking. The system includes one or more configurable elements (e.g., controllers, field devices, etc.), a change tracking system that records of changes to those configurable elements (e.g., for compliance reporting, etc.) and a change detection system that responds to changes made to the configuration of those elements (e.g., outside the purview of a configuration editor), by inferring an identity of a person and/or device responsible for a change, the time of the change, and/or the reason(s) for the change. This is unlike prior art systems, in which that such information is typically specified by an editor or other configurator subsystem, e.g., in a data entry form (or widget) completed by the field engineer, operator or other who is making the change.

Inference Based on Live Lists of Users

Related aspects of the invention provide systems, e.g., as described above, in which the change detection system infers the identity of a person responsible for a change from a list of "live" users on a control network to which the element(s) are coupled. These live users are, for example, those that are logged-in and/or active on the network.

In such a control system, by way of non-limiting example, the change detection system can respond to indication that the configuration of a field device has been changed (e.g., outside the configurator) by querying the network for a list of users who were logged-in at the time of the change and, further, for example, by winnowing down that list to identify users with sufficient access and permissions to effect the change. The change detection system can, further, winnow down such a list to identify (a) users who are expected to make changes (e.g., field engineers), and/or (b) users who are not expected to make changes and whose log-ins might suggest surreptitious activity.

In related aspects of the invention, the change detection system winnow the live user list based on the result of queries to asset management, employment, IT or other databases and/or other stores of information about the control system, the devices and/or the people with potential access to it and/or responsible for changing it. Continuing the example above, the change detection system can access a maintenance database to discern which of the users on the live list were expected to make a detected configuration change. Alternatively or in addition, that subsystem can access personnel databases to identify users that scheduled to have been on vacation at the time the change was made.

Further related aspects of the invention provide systems, e.g., as described above, in which the change detection system infers the identity of a person responsible for a change from information resident on and/or supplied by the device that made the change. In such a control system, by way of non-limiting example, the change detection system can respond to indications that the configuration of a field device has been changed by querying a proxy or other software executing on the responsible device for the identify of the operator (or "user") who made the change. Thus, for example, that resident software can query memory locations on the device for the user's identity and can return that to the change detection subsystem.

Alternatively, or in addition, the resident software can query the user of that device directly, e.g., by way of a pop-up dialog box or otherwise to ask his/her identity. As above, queries by the change detection system to the resident software and/or responses by it can be made at or around the time the change is detected or subsequent thereto.

Inference Based on Live Lists of Devices

Other aspects of the invention provide systems, e.g., as described above, in which the change detection system infers the identity of a person and/or a device responsible for a change from a list of devices that were "live" on the control network at the time of the change—and, more particularly, for example, from a list of those live devices that were in direct or indirect communications coupling with changed element.

These live devices are, for example, those that are actively coupled to the network and on which a user is logged-in (or in which a process capable of effecting the change is active)—or that, more generally, are sufficiently coupled to the changed as to enable a user (or process) to effect the change to the configurable elements.

In such a control system, by way of non-limiting example, the change detection system can respond to a change (e.g., made outside the configurator) by querying the network for a list of devices that are active and logged in to the control network to identify those capable of effecting a configuration changes. The change detection system can, further, winnow down the live list to identify workstations, personal computers, portable computers, personal digital assistants and other devices on which a logged-in user might effect the detected change. It can further include, of example, winnowing such a list to identify (a) devices from which a change is expected to be made (e.g., a plant floor-based workstation, and/or (b) unexpected devices from which a surreptitious change might be made (e.g., an unregistered portable computer or PDA).

In further related aspects of the invention, the change detection system can query one or more devices identified from the live list, e.g., to identify the user responsible for the detected change. Thus, for example, the change detection system can query memory locations on the device to identify logged-in users (or active processes) at or around the time of the change.

Inference Based on Enterprise, Control System or Other Databases

In related aspects of the invention, the change detection system can supplant or supplement querying of the live lists of users and/or devices with querying of asset management, employment, IT or other databases and/or other stores of information about the control system, the devices and/or the people with potential access to it and/or responsible for changing it. Continuing the example above, the change detection system can access a maintenance database to discern which of the devices and/or their respective users on the live lists were expected to make a detected configuration change. Alternatively or in addition, that subsystem can access an IT database to identify which devices on such a list are assigned to which users and/or to identify which devices on that list were previously reported as checked-out/lost/stolen (and, thus, may be the source of permitted vs. surreptitious activity). Alternatively or in addition, that subsystem can access a personnel database to discern which of those users whose job roles included making changes of the type detected were on duty at the time of the change.

Still further aspects of the invention provide methods for process, environmental, manufacturing, industrial or other such control system with enhanced change tracking that parallel operation of the systems described above.

These and other aspects of the invention are evident in the drawings and in the discussion that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

System Architecture

Figure 1:
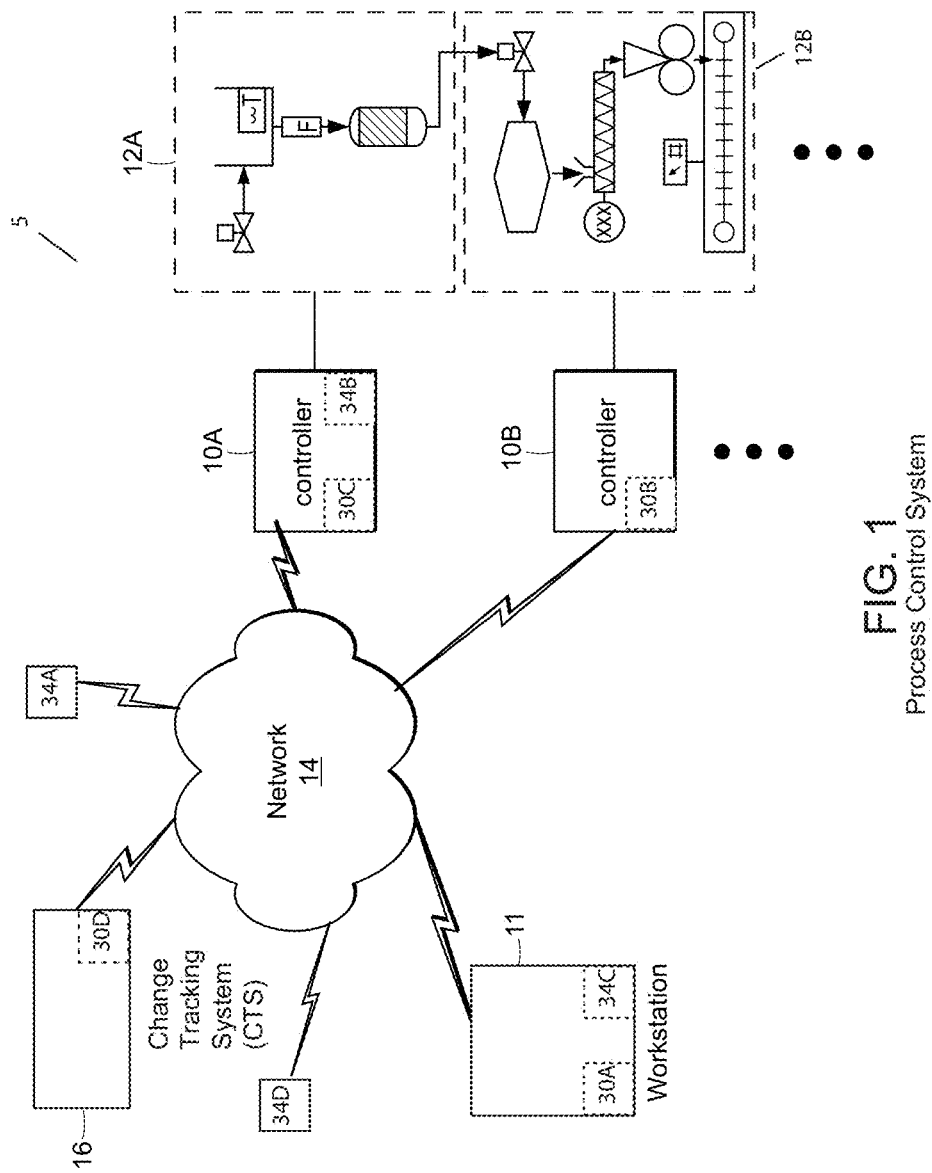
FIG. 1 depicts a control system of the type in which the invention is practiced.

FIGS. 1-2 depict an illustrative control system 5 of the type with which apparatus and methods according to the invention may be practiced. The illustrated system is particularly adapted for use in connection with process control, as discussed further below. However, those skilled in the art will appreciate that apparatus and methods according to the invention can be used in connection with other control systems. In this regard, subsystems 12A, 12B can encompass any industrial, manufacturing, service, environmental or other process, device or system under monitoring or control (hereinafter, collectively, "control").

The system of FIGS. 1-2 includes a workstation 11 that is coupled to one or more control devices, here, controllers 10A, 10B, actuators 18, sensors 24, 26, and so forth, as illustrated, on some of which reside process control algorithms for monitoring and/or controlling one or more processes within subsystems 12A, 12B. These may represent independent processes or different aspects of the same or related processes. Moreover, the processes encompassed in subsystems 12A, 12B may reside within a single plant, site or area, cell or unit or, conversely, they may dispersed among many plants, sites, areas, cell or units.

Workstation 11 represents an engineering workstation, personal computer, mainframe computer or other digital data processing device suitable for modeling and/or configuring a control system 5 (e.g., here, controllers 10A, 10B and other control devices, such as actuators 18, sensors 24, 26, and other field devices and/or the apparatus controlled thereby). Though illustrated as being carried out on workstation 11, those skilled in the art will appreciate that the modeling and configuration functions can be executed on suitably configured controllers 10A, 10B or other control devices (e.g., smart field devices or other control devices those having sufficient processing power and interfaces to provide the graphical and other configuration functions described herein). A discussion of the use of smart field devices and other control devices for modeling and control is provided, by way of example, in U.S. Pat. No. 6,788,980, entitled "Methods and Apparatus for Control Using Control Devices That Provide a Virtual Machine Environment and That Communicate Via an IP Network," the teachings of which are incorporated herein by reference.

Network 14 provides a medium for communications, real-time or otherwise, among and/or between the elements of the control system 5, including workstation 11, change tracking system 16, controllers 10A, 10B and other control devices 18, 19, 24, 26 and controlled apparatus. The network 14 also provides a medium permitting the downloading of control algorithms and other configuration information, e.g., to controllers 10A, 10B and other control devices 18, 19, 24, 26 (or controlled apparatus), e.g., from workstation 11. It can also provide a medium for uploading information from controllers 10A, 10B and other control devices 18, 19, 24, 26 (or controlled apparatus) to those other digital data processors 11, 16. Though illustrated to represent a LAN, WAN, or global network (Internet), those skilled in the art will appreciate that element 14 may represent any medium or mechanism through which control algorithms and configuration and other information may be transported, electronically, physically or otherwise, to and from and/or among the illustrated elements 10A, 10B, 11, 16, 18, 19, 24, 26.

Change tracking system (CTS) 16 logs changes to the control system 5, e.g., to controllers 10A, 10B and the other control devices (e.g., actuators 18, sensors 24, 26, and other field devices) or controlled apparatus. This can be for regulatory purposes, safety purposes, maintenance purposes or otherwise, which the system 16 can additionally support, e.g., via retrieval and reporting services (discussed below). That logged information can include, by way of non-limiting example, control algorithms, operational parameters, I/O assignments, and so forth. In the illustrated embodiment, CTS 16 comprises a conventional change tracking (or management) system of the type known in the art and/or commercially available in the marketplace (e.g., the FoxCMS®, marketed by the assignee hereof) as adapted in accord with the teaching hereof.

Exemplary Control Subsystem

Figure 2A:
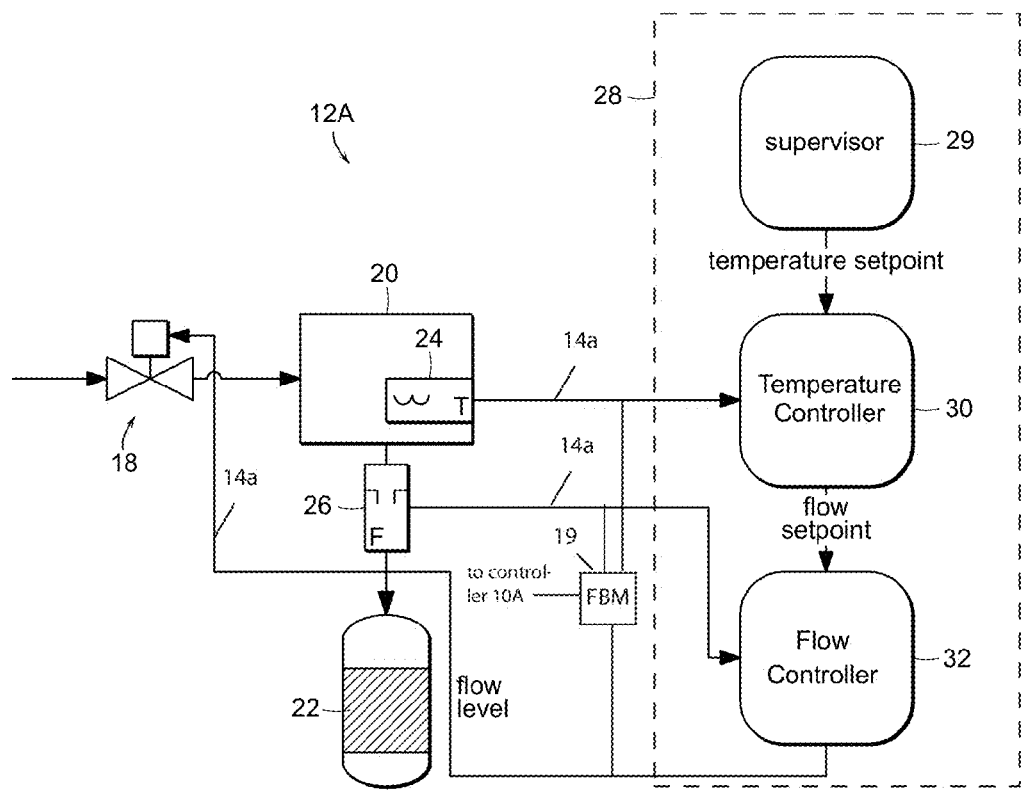
FIGS. 2A-2B depict a process control system of the type with which the invention is practiced.

An exemplary subsystem 12A including a control process is illustrated in greater detail in FIG. 2A. It shows an actuator, such as valve 18 (or other field device), that governs the rate of fluid flow to aeration tank 20 which, in turn, transfers the liquid to storage tank 22. Field devices, i.e., sensors 24 and 26, monitor the state of process 12A and, thereby, facilitate its control by controller 10A which executes a control algorithm 28. Thus, sensor 24 is disposed in or adjacent to tank 20 for measuring the temperature of fluid therein, while sensor 26 measures the flow of fluid from aeration tank 20 to storage tank 22. The illustrated actuator (valve 18), sensors 24, 26 and other field devices (not shown) in the illustrated subsystem may of the "smart" variety or otherwise. In this regard, "smart" field devices are those of the type known in the art that may, for example, include embedded processors and/or other logic suitable for advanced configuration and/or operational modes including execution of control algorithms of their own.

FIG. 2A further illustrates a control algorithm 28 of the type that can be configured by methods and apparatus according to the invention. Here, the algorithm 28 is executed by controller 10A to communicate with and/or coordinate operations of the field devices 18, 19, 24, 26 and, thereby, to control the processes being carried out in subsystem 12A. The algorithm 28 includes blocks or other entities 29, 30, 32, that model those field devices—and, more generally, that model those and other control devices and other elements within subsystem 12A or, more generally, in system 10 and the apparatus controlled thereby—and that monitor and/or control the states and interactions between those entities.

Entities 29, 30, 32 comprise software components which may include, by non-limiting example, source, intermediate or executable code, databases, of the type conventionally used in the art for operating controllers, field devices, control devices and other control equipment. Referenced in this regard in the discussion below are software components, and process control systems in general, marketed as the I/A Series® systems (hereinafter, "IAS" or "I/A") available from the assignee hereof Those skilled in the art will appreciate that methods and apparatus according to the invention can be used to model processes and configure control algorithms for use with other control systems, as well.

Figure 2B:
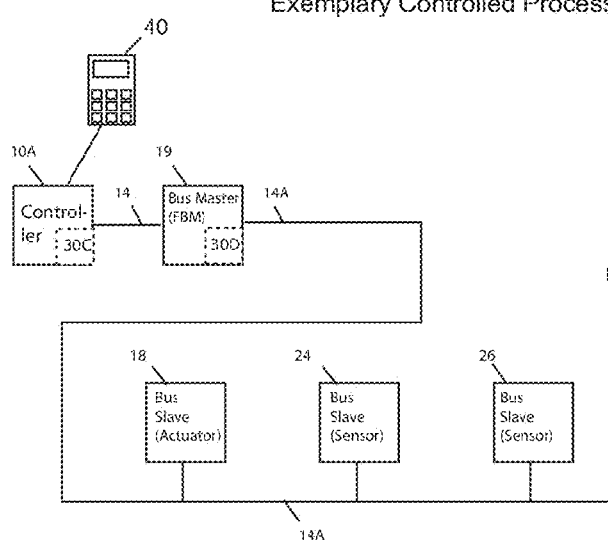

FIGS. 2A and 2B further illustrate that one or more of the control devices—e.g., controllers 10A, 10B, workstation 11, change tracking system 16, and the other control devices (e.g., actuators 18, field bus module 19, sensors 24, 26, and other field devices) or controlled apparatus—can be coupled for communication via portions of the network 14, here, network segment 14a. Those segments can comprise any network media known in the art and/or available in the marketplace suitable for such purposes. The segments can operate in accord with Profibus, Fieldbus, Hart, Modbus or other "process control" communications standards, and can include (as applicable) bus masters and/or slaves necessary and/or desirable to practice in accord with those standards. A further appreciation of the configuration and operation of such network segments may be attained by reference to incorporated-by-reference U.S. patent application Ser. No. 12/474,942.

Configurator

The illustrated system utilizes a Control Algorithm Configurator, to model and configure control processes, as well as to logging downloaded configuration information for change tracking. That system can be constructed and operated in the manner of process control configurators of the type known in the art—as adapted in accord with the teachings hereof. Thus, by way of example, it can be constructed and, operated in the manner of the process control configurator (i) referred to as the "IDA Control Algorithm Configurator," and the like, in aforementioned incorporated-by-reference U.S. Pat. No. 6,754,885, and/or (ii) referred to as the "Control Algorithm Configurator," the "Configurator," in incorporated-by-reference U.S. patent application Ser. No. 12/474,942—either or both, again, as adapted in accord with the teachings hereof.

By way of overview, the Configurator employs objects (or other data and/or programming constructs) to represent the devices that make up the control system, the entities that define the control algorithms executed by those devices, the processes or systems being monitored and/or controlled by those devices and algorithms, as well as the entities within the configuration apparatus itself.

In the illustrated embodiment, the objects represent, by way of non-limiting example, field devices, field bus modules (FBMs), control devices, control processors, blocks, loops, compounds, bus masters, bus slaves, networks, field buses, historians, object type categories, object connections, parameter connections, display placeholders, graphical display entities, and reports—all by way of non-limiting example. They also represent entities of a control level hierarchy, e.g., sites, areas, process cells, units, and the like. Thus, by way of non-limiting example, the Configurator utilizes objects to represent the elements shown in FIGS. 1, 2A and 2B, including, but not limited to the bus master (FBM) 19 and bus slaves (e.g., actuator 18 and sensors 24, 26).

In the illustrated embodiment, the objects are stored in the database(s) and are referred to as the "model," the "configuration model," the "control system model," and the like. Such a model is depicted in the object diagrams provided in the figures attached to aforementioned incorporated-by-reference U.S. Pat. No. 6,754,885 and U.S. patent application Ser. No. 12/474,942 and discussed therein, as well as by the graphical and textual representations thereof (typically, in the context of the editors), again, in the figures attached thereto and discussed therein.

Parameters define characteristics of each object and, therefore, of the element or entity the object represents. Depending on the type of object, these include inputs, outputs, alarm limits, control functions and display characteristics, among others. Each parameter can have attributes that define the parameter's value and other attributes. These include, for example, parameter name, parameter grouping, display label, data type, behavior, help information, edit type, data value range, formula definition, and display format.

Databases

The control system model can be stored in central databases and/or distributed among workstation 11, controllers 10A, 10B and other control devices, e.g., as disclosed in aforementioned, incorporated-by-reference U.S. Pat. Nos. 7,096,465 and 6,788,980, as well as in PCT Application WO03/89,995, entitled "Methods and Apparatus for Process, Factory-Floor, Environmental, Computer Aided Manufacturing-Based or Other Control System With Real-Time Data Distribution," the teachings of which are also incorporated herein by reference.

In addition to modeling database(s), the illustrated control system can include and/or be coupled to one or more enterprise, control system or other databases of the type typically employed by or in connection with control systems. These include, for example, asset management, employment, information technology (IT) or other databases and/or other stores of information about the control system, the devices and/or the people with potential access to the control system—i.e., the control devices (e.g., controllers 10A, 10B, workstation 11, change tracking system 16, and the other control devices, such as actuators 18, module 19, sensors 24, 26, and other field devices) or the apparatus controlled thereby.

The foregoing modeling databases and other databases are represented for illustrative purposes only by elements 34A-34E in the drawings. Though shown distributed around the control system, these may be consolidated in fewer or distributed among more such devices or elsewhere or otherwise, all in the conventional manner known in the art.

Configurator Architecture

Figure 3:
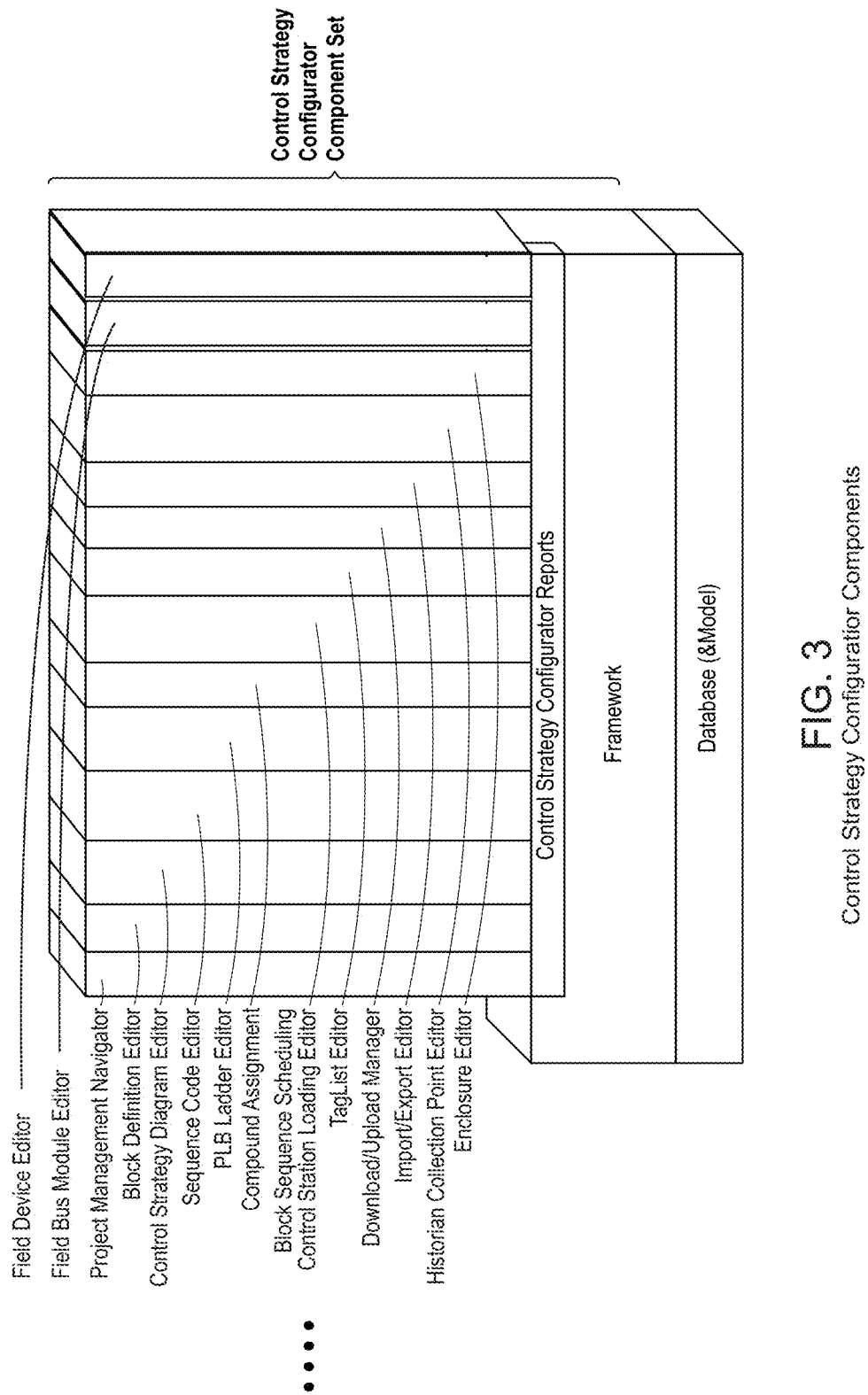
FIG. 3 depicts control algorithm configurator components in a system according to the invention.

Referring to FIG. 3, a Configurator according to one embodiment of the invention includes a Framework, a database, a project manager and a set of editors. The Framework provides common resources, such as menus, toolbars, dialogs, and security services, used by the editors to manipulate, display and report configuration data stored in the model/configuration database. In one practice of the invention, the Configurator and Framework are packaged as a single application. This software package can be installed on workstation 11 or other digital data processor.

Figure 4:
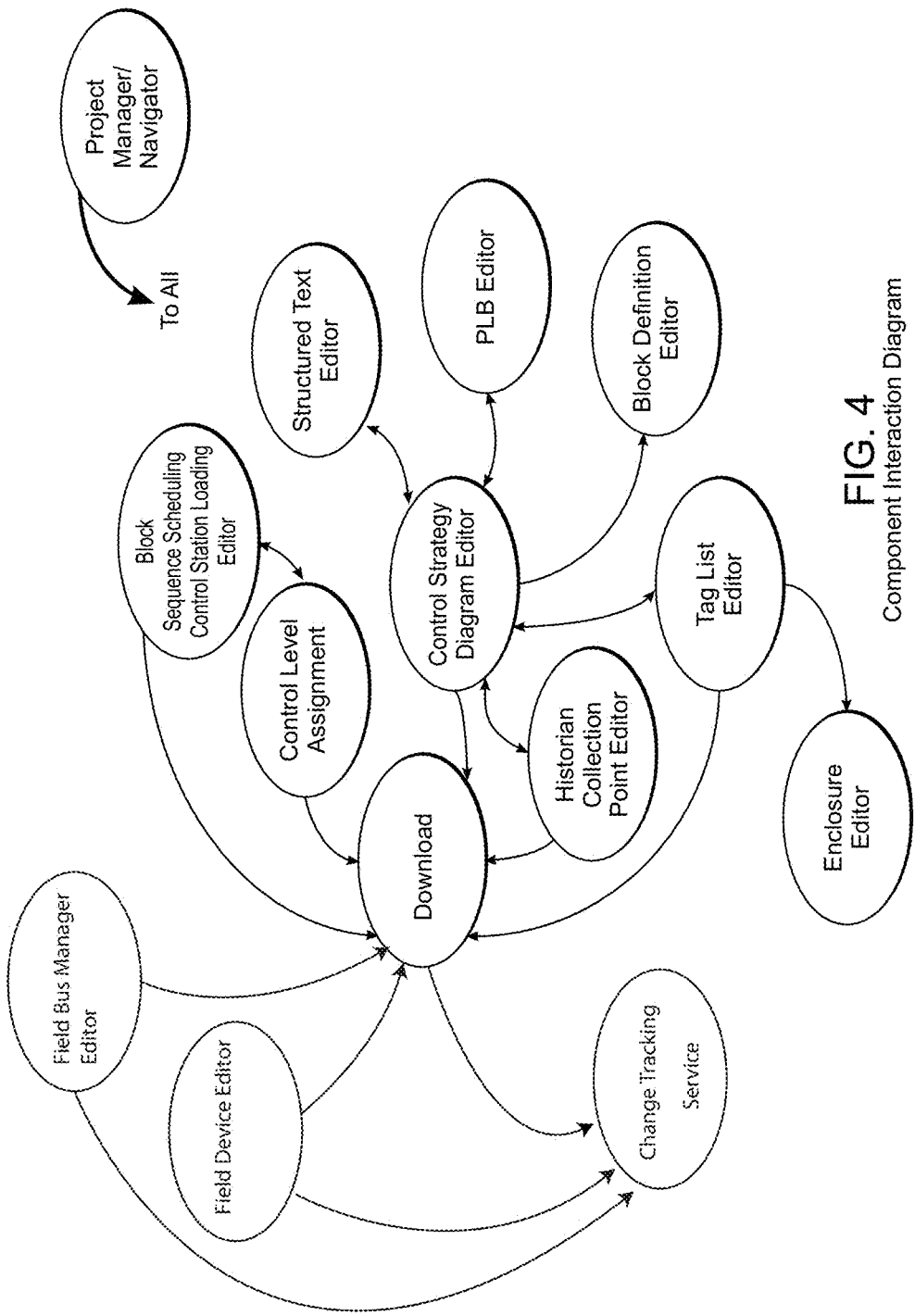
FIG. 4 depicts component interaction in a system according to the invention.

The editors are used by the implementation creator to create and maintain standard control scheme definition objects distributed with the implementation and by users to create their own plant control schemes. The Project Manager allows the user to browse through the project configuration hierarchies and data. Interactions among the editors and the project manager/navigator are shown, by way of non-limiting example, in FIG. 4.

The database, which may comprise one of aforementioned components 34A-34E, forms part of an object oriented database management system (OODBMS), which may be any type commercially available in the marketplace. The database can be deployed in a client/server configuration with a single centralized database per plant servicing multiple clients, or otherwise. In the illustrated embodiment, it resides on the workstation 11, e.g., or on a digital data processor coupled therewith.

A user can employ Configurator editors to create and maintain control scheme definition objects distributed with the implementation and to create their own plant control schemes. Thus, for example, a user can employ an editor to define one object as a descendant of another object at the time of configuration. An object so defined derives parameters from its ancestor which, in turn, derives parameters from its own ancestors, and so forth. Editors also facilitate definition, during configuration, of the association between parameters and their respective objects. Editors can also be used, by way of non-limiting example, to establish relationships between objects—for example, a user can employ an editor to select objects that represent field devices and indicate (e.g., via a drag-and-drop operation, a menu option or other command) that she wishes to establish a relationship with an object that represents a control processor.

To illustrate by way of a non-limiting example, an apparatus according to the invention for use in configuring process control systems can employ an object to model a "conventional" analog input (AIN) field device of the type used in a particular product. That object can include output, high-high alarm, high-low alarm and other parameters of the type used for modeling such devices. The Configurator can be used to define a further object, one that models an analog input device for use in high-temperature environments. That object can descend from the general AIN object and inherit its parameters, e.g., the high-high alarm and high-low alarm parameters. Configuration-time changes to the parameters of the general AIN object can automatically carry through to the high-temperature AIN object, thus, facilitating configuration of the process control system.

The editor can be used to define a further object, one that models an analog input device for use for high-temperature measurements (throughout). That object can descend from the general AIN object and inherit its parameters, e.g., the high-high alarm and high-low alarm parameters, along with their respective attributes—e.g., their alarm value and track attributes. The editor can be used, for example, to alter those attributes, e.g., changing the alarm values, say, for the high-low alarm of the new object.

Figure 5:
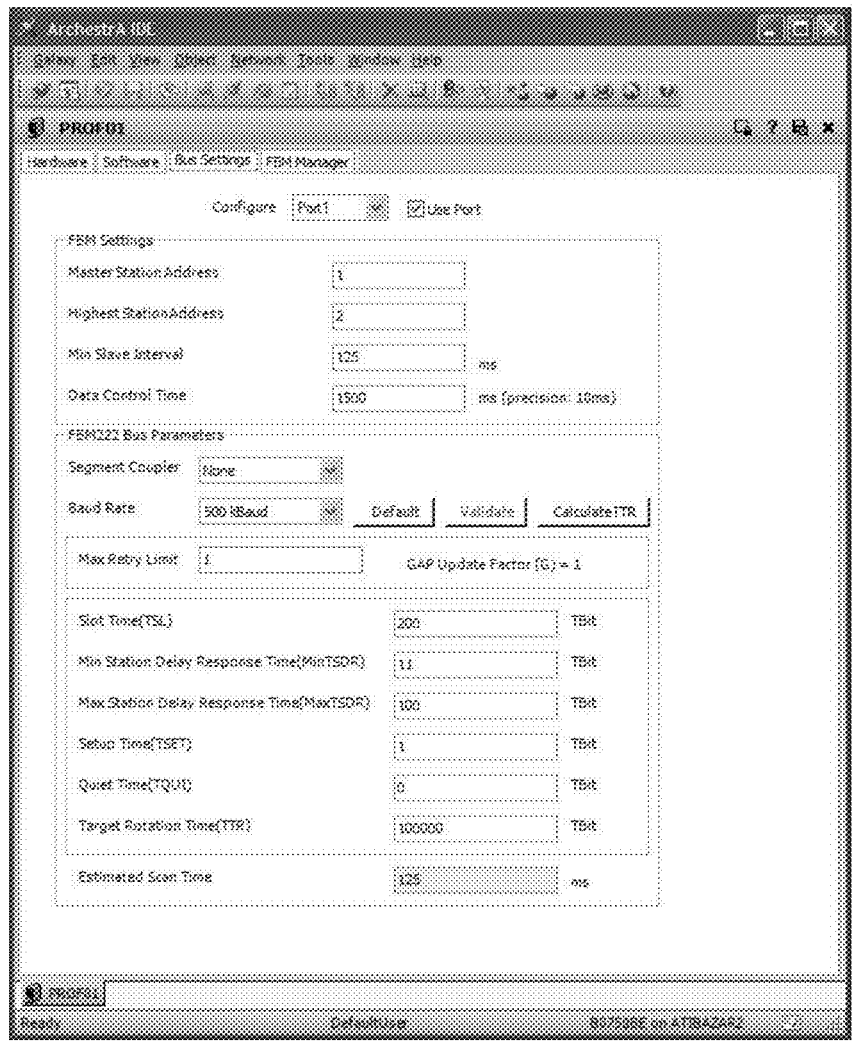
FIG. 5 depicts an exemplary editor (here, a field bus module editor) in a system according to the invention.

An editor of the type employed by the Configurator is shown, by way of example, FIG. 5. This shows a Field Bus Module editor that permits a user to define and/or modify parameters of objects in the database that represent devices that serve as field bus masters, i.e., devices that configure and/or control communications on field buses 14A or other sections of the network 14 (see FIGS. 1 and 2A-2B). This can include, by way of non-limiting example, parameters defining timings, port assignments and/or other aspects of the configuration of the respective segments that those bus masters are responsible for configuring and/or controlling.

In addition to recording changes requested by users, preferred Configurator editors record the identity of the person making the change, the time of the change, and/or the reasons for the change. The editors can query users to supply some or all of this information with each change and/or can infer it from application or system logs. Thus, for example, configuration editors can determine user identity from system files identifying the currently logged-in user and can determine time of change from the system clock, all by way of example. The editors can query users for the change justifications (reasons) at the time of each change and/or at the time an edit session is begun.

Download System

Returning to FIG. 4, the Configurator includes a download system or download service, labelled "Download" in the drawing, that transfers configuration information from objects in the model to respective devices of the control system and/or control apparatus, e.g., controllers 10A, 10B and the other control devices (e.g., actuators 18, module 19, sensors 24, 26, and other field devices) or controlled apparatus. The Download Service can be invoked automatically, for example, whenever a user completes an editor session, though, more typically, it is executed by explicit request of the user (e.g., after she has completed a series of editor sessions and verified changes to the model via "manual" checking, via simulator, or otherwise). By way of example, after completing a session with the Field Bus module editor to set values for port assignments, bus timing parameter, etc., the user can invoke the Download Service to configure the corresponding control system elements.

Upon invocation, the Download Service of the illustrated embodiment transfers configuration information from objects in the model to the devices that they (the objects) represent. Continuing with the example, this includes transferring, to the respective bus masters, communications configuration information for their respective segments. (Of course, where objects representing other control system elements have been changed, instead or in addition, it means transferring information for them, instead or in addition, respectively). Downloads can go directly to the respective devices or can go indirectly, e.g., via other devices, such as controllers, field bus modules, as per convention.

At the same time, the Download Service logs those transfers to the change tracking system (CTS) 16. This includes logging the downloaded device parameters, as well (in some embodiments) as the identity of the person and/or device making the change, the time of the change and of the download, and/or the reasons for the change. These transfers to the CTS can be via RPC calls, via calls to functions the CTS exposes in an applications program interface (API), or otherwise. In the illustrated embodiment, the transfers to the CTS are effected by XML files.

By way of example, in connection with downloading configuration information to a device whose system i.d. is "FBM00222," the Download Service can generate an XML file named, for example, "FBM00222.xml" that contains a listing of parameters downloaded to the device, as well as their respective values—or, referring to the Parameter Definition attribute set above, by including in the XML file the "name" attribute of each parameter for which a value is downloaded, as well as that "value" attribute, though, other attributes can be used instead or in addition.

In other embodiments, the Download Service can generate and the change tracking system 16 can accept change-tracking information in other formats (e.g., as appended parameters to HTTP calls on network 14, as fields of remote procedure calls, or otherwise) and/or grouped in other ways (e.g., one file per parameter changed, multiple devices per file, or otherwise).

Change Tracking System

As noted above, change tracking system (CTS) 16 logs changes to the control system 5, e.g., to controllers 10A, 10B and the other control devices (e.g., actuators 18, module 19, sensors 24, 26, and other field devices) and/or the apparatus controlled thereby. This can be for regulatory purposes, safety purposes, maintenance purposes or otherwise, which the system 16 can additionally support, e.g., via retrieval and reporting services (discussed below). That logged information can include, by way of non-limiting example, control algorithms, operational parameters, I/O assignments, and so forth.

CTS 16 accepts XML files generated, e.g., by the Download Service, the field bus module editor and/or the field device editor, that contain textual (e.g. ASCII) or other representations of configuration information downloaded to devices and named to match (or otherwise in accord with) those devices. The textual or other representations contained in those files includes names of the fields, parameters, etc., to which information is downloaded, as well as the values so downloaded. In other embodiments, the change tracking system 16 can accept the information to be logged in other formats (e.g., as appended parameters to HTTP calls on network 14, as fields of remote procedure calls, or otherwise) and/or grouped in other ways (e.g., one file per parameter changed, multiple devices per file, or otherwise) and/or transmitted in accord with other protocols and/or mechanisms.

Configurator Revisited

In addition to permitting configuration changes to be downloaded (and tracked) after completion of edit sessions, the illustrated Field. Bus Module editor includes a Direct Download feature, that permits users to make direct and immediate (or "real-time") edits of configuration values stored in the bus master devices. Thus, for example, as the user defines and/or modifies parameter values using the editor's dialog boxes and other edit controls, the editor invokes the FDT or other interface (hereinafter, "interface") of the corresponding device to cause those values to be loaded into it (the device) while, at the same time, updating the corresponding model objects so that they maintain an accurate representation of the device. The editor also logs the changes to the change tracking system 19, e.g., in the same manner as the Download Service logs transfers it makes to such devices (e.g., via the use of XML files), as discussed below.

The Configurator may incorporate other editors, with greater or lesser functionality than that discussed above in connection with FIG. 5, for types and/or classes of field bus modules and/or for other elements of the control system, e.g., controllers 10A, 10B, and the other control devices (e.g., actuators 18, module 19, sensors 24, 26, and other field devices) or controlled apparatus.

A further appreciation of the editors, download system, change tracking system (or "change tracking service"), and Configurator utilized in an embodiment of the invention may be attained by reference to incorporated-by-reference U.S. Pat. No. 6,754,885 and U.S. patent application Ser. No. 12/474,942.

As those skilled in the art will appreciated, other embodiments may utilize editors, download services and/or change tracking services that operate in other ways, known in the art or otherwise.

Enhanced Change Tracking

Illustrated control system 5, additionally, tracks configuration changes that are made outside the Configurator (and Download Service). Thus, for example, it can log to the CTS 16 changes made to configurable elements in the control system directly and/or indirectly (e.g., via other elements of the control system—other than the Configurator). In addition to logging those changes to CTS 16, the system infers the identity of the person (and/or device) responsible for the change, the time of the change and/or the reason(s) for the change. This is information that would normally be recorded by the Configurator and logged to the CTS along with the changes themselves. This is unlike prior art systems in changes made outside the configuration editor may be undetected or, if detected, lacks additional identity/time/reason information necessary for adequate record-keeping.

This is advantageous, for example, in tracking changes made to controllers, field bus managers, "smart" field devices and/or other control devices with embedded processors and/or other logic suitable for direct configuration via on-board keypads, etc. and/or via self-generated configuration interfaces (accessible by network 14 and/or segment 14a, wirelessly, or otherwise). Even for devices or apparatus that do not themselves provide for direct configuration, this is useful for tracking changes made to them via other devices, whether part of the control system or not. This can include, for example, tracking changes made by ad hoc, but permitted devices, as well as tracking changes made by rogue devices and/or in surreptitious manners.

As used herein, references to the "time" a change is made to a configurable element of the control system mean a date or time and, many embodiments, both. Moreover, the terms "users," "operators" and like refer not only to persons that are utilizing workstations, personal computers, portable computers, PDAs, and/or other devices from which changes to configurable elements may be effected, but also to daemons and other processes that are executing autonomously (or otherwise) on such devices.

Referring back to FIG. 1, the illustrated system includes a change detection system (CDS) 30 that supports enhanced change tracking as discussed above and detailed below. In the illustrated embodiment, that subsystem comprises functional components 30A-30D whose operation is distributed among devices of the control system—here, among controllers 10A, 10B, workstation 11, and change tracking system 16. The components 30 can communicate with one another and co-share responsibility on a peer-to-peer basis; alternatively, one can serve as a "master" that coordinates the actions of the others and/or as a "server" that provides services to the others for purposes of facilitating enhanced change tracking in accord with the teachings hereof. The components 30A-30D communicate with the elements on which they reside directly or indirectly; they may communicate with other elements of the control system via network 14, all in the conventional manner known in the art as adapted in accord with the teachings hereof.

The configuration of CDS 30 shown here is by way of example. In other embodiments, the CDS 30 may be distributed among other devices of the control system and/or of the controlled apparatus. Alternatively, it may be consolidated in a single one of those device or in another element of the system (e.g., within change tracking system 16 or within a dedicated change detection system). Regardless, the components 30A-30D may be implemented in software executing on general purpose processors (embedded or otherwise) of their respective devices 10A, 10B, 11, 19; though, in other embodiments, they may be implemented on special-purpose hardware, instead or in addition, all in accord with the teachings hereof.

Figure 6:
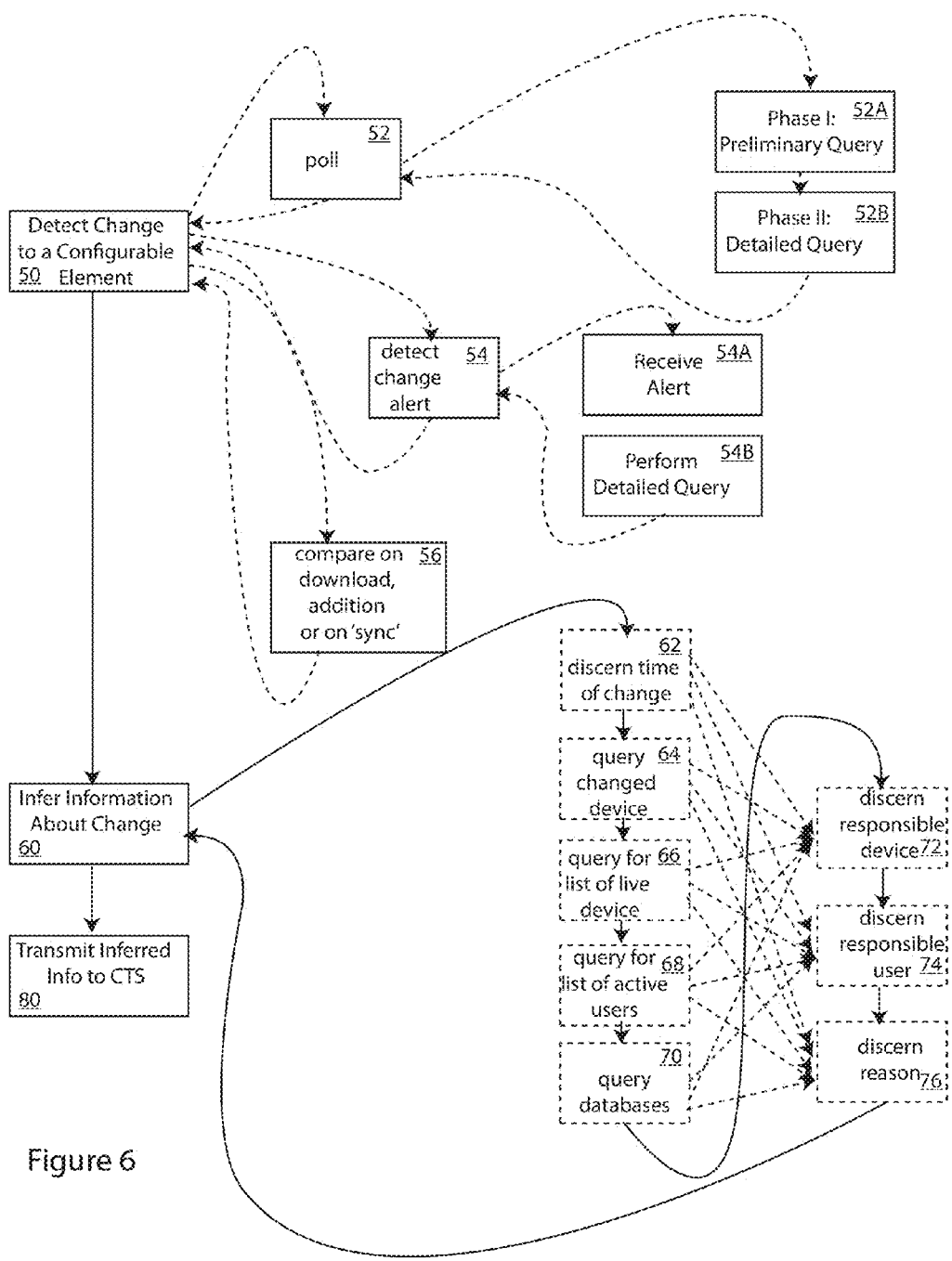
FIG. 6 depicts a process for enhanced change tracking in accord with the invention.

Operation of Illustrated CDS 30 is shown in FIG. 6. Consistent with the foregoing, this may be effected by software executing on a single one of the elements (e.g., component 30D executing on or in connection with CTS 16) or on multiples ones of those elements. In the illustrated embodiment, these element(s) execute steps discussed below and shown in the drawing. Other embodiments may eliminate some of these steps and/or execute other steps instead or in addition, all in accord with the teachings hereof.

In step 50, the CDS 30 detects that a change has been made in one of the configurable elements of the control system 5—and, specifically, that the configuration of that element varies from that reflected in the control model. Typically, this indicates that a change to the element has been made outside the Configurator (and Download Service). This may be, for example, a change to workstation 11, though, of potentially greater import, it may be a change to network segments 14a, controllers 10A, 10B and the other control devices (e.g., actuators 18, module 19, sensors 24, 26, and other field devices) and/or the apparatus controlled thereby—some or all of which may be remotely disposed (e.g., from the workstation 11) and, therefore, potentially subject to unsupervised or even surreptitious change.

Changes may be detected in any of several ways, depending on configuration of the network 14, the capabilities of the respective configurable elements, and so forth. This includes polling one or more of the elements (step 52), responding to change alert signalling initiated by the elements themselves (step 54) and/or comparing the element configurations (a) during downloads initiated by the Configurator or operator and/or when a device or other element is added to or sync's with the control system (step 56).

In step 52, the CDS 30 queries each of one or more of the configurable elements on an ad hoc, sporadic and/or period basis, e.g., hourly or daily to determine if the configuration of that element has changed since the time of the last download from the Configurator. The query can be made via network 14 or other communications mechanism (e.g., a separate wired or wireless channel) in accord with the protocol employed by that network and/or communications mechanism and by the element being queried. Other queries discussed in the text that follows may be made via similar mechanisms or otherwise.

In the illustrated embodiment, the query takes place in a few phases. In a first phase (step 52A), the CDS queries each element for preliminary data indicating that a change has or might have been made to the element's configuration. Such a preliminary query can be for the value of a change flag stored on the element, for an identifier (e.g., version number or timestamp) of the current configuration stored on that device, for a checksum of that configuration, and/or for some other information from which the CDS 30 can discern that a change may have been made outside the configurator (but not necessarily what the change is).

The CDS can then compare that data with information maintained in the modeling databases regarding the configuration last downloaded from the Configurator (e.g., by the Download Service). If the comparison suggests that the configurations match or, put another way, that no change has been made to the queried element since the time of the last download from the Configurator—the CDS treats that configurable element as unchanged and proceeds with polling (e.g., entering a wait state until the next scheduled polling of that element or querying the configurable element in the polling sequence).

On the other hand, if the information gained by the CDS 30 in the first query suggests that that a change has been made to the queried element since the time of the last download from the Configurator, the CDS can proceed with a second phase of the query. See step 52B. In this phase, the CDS 30 queries the configurable element for detailed data regarding the element's current configuration. In the illustrated embodiment, this includes all or a portion of the configuration stored on the element, along with any associated information maintained by the element about that configuration (e.g., download timestamp, download port, etc.)

While in some embodiments, the CDS compares that more detailed data with correspondingly more detailed information from maintained in the modeling databases regarding the configuration last downloaded from the Configurator to verify whether indeed a change has been made (and, if not, ignores or logs the results of the preliminary phase 52A and proceeds with polling as above), in other embodiments it readies that data for logging to the CTS along with the "inferred" information discussed below in connection with steps 62-76.

As those skilled in the art will appreciate, a multi-phase query of the type exemplified in steps 52A-52B has the advantage of reducing the "administrative" load placed on the CDS 30, the configurable elements and the network 14 during polling. Accordingly, in some embodiments, the CDS performs the query in more than two phases. Likewise, in some embodiments, the CDS delays the second phase until such times as the normal operational load on the configurable elements and/or the network 14 is reduced. Notwithstanding the advantages of a multi-phase query, in some embodiments, querying is accomplished in a single phase.

Alternatively or in addition to the polling discussed above, the CDS 30 can detect that a configurable element has been changed via alert signalling received directly from that element indicating that its configuration has (or is being) changed. See step 54A. In this regard, smart field devices and/or other configurable elements may be equipped with native (or other) functionality that causes them to generate alerts whenever changes are made to their configurations via on-board keypads, etc. and/or via self-generated configuration interfaces accessible by network 14 and/or segment 14a, wirelessly, or otherwise. Such alerts can be received by the CDS 30 from the configurable element via network 14 or other communications mechanism, as above. In some embodiments, these alerts can include timestamps reflecting the time that changes are made.

Upon receiving such an alert, the CDS 30 queries the element that generated it for detailed data regarding that element's current configuration. See step 54B. As with step 52B, in the illustrated embodiment, this includes all or a portion of the configuration stored on the element, along with any associated information maintained by the element about that configuration (e.g., download timestamp, download port, etc.)

As above, in some embodiments, the CDS compares that more detailed data with correspondingly more detailed information from the modeling databases regarding the configuration last downloaded from the Configurator to verify whether indeed a change has been made and, if so, readies that data for logging to the CTS along with the inferred information gained in steps 62-76, discussed below. (As above, if the comparison reveals that no change has been made, the CDS can ignore the alert or simply log it).

With continued reference to step 54, in some embodiments, the alert signalling referred to above need not come directly from the element that has been (or is being) changed. Rather, the CDS 30 can respond to an alert received from a first element of the control system (e.g., a field bus module or a controller) indicating that a second element of the system (e.g., a field device) has been or is being changed by querying that second element as discussed above in connection with step 54B and readying the more detailed data obtained from it for logging, as discussed above.

Alternatively or in addition to polling and/or responding to alerts signaled by a changed element, the CDS 30 can be alerted by the Configurator that a configurable element of the control system (a) has been changed other than through operation of the Configurator and/or the Download Service, and/or (b) has been newly added to and/or sync's with the control system. See step 56.

In this regard, the Configurator can utilize the Download Service, or related functionality, to upload all or a portion of the configuration stored on the configurable element, along with any associated information maintained by the element about that configuration (e.g., download timestamp, download port, etc.), and can compare that data with corresponding information in the modeling databases regarding the configuration last downloaded to that element. The Configurator can do this (a) when a Configurator editor for the element is invoked, (b) when the Download Service is invoked to download editor-made changes to that element, (c) when an element is newly coupled to the control system and/or attempts to sync with it, or at another time. If it detects differences, the Configurator can notify the CDS 30 and can supply to it data for logging to the CTS along with the inferred information gained in steps 62-76, discussed below.

Though step 56 is performed by the Configurator in some embodiments, in others one or more aspects of those steps are performed by the CDS 30—for example, on being alerted by the Configurator that it (the Configurator) is being invoked to edit one or more objects in the control model pertaining to a given element. Alternatively, or in addition, the Configurator can query such an element in phases, e.g., as discussed above in connection with steps 52A-52B, alerting the CDS 30 that the element has (or may have been changed) after either step of the query In step 60, the CDS infers information about the change to a configurable element detected in steps 50-56. That change is often referred to below, simply, as the "change," the "detected change," or the like. As above, this may be done in any of several ways, depending configuration of the network 14, the capabilities of the respective configurable elements, and so forth. This includes determining the time of change (step 62), inferring the identify of the device responsible for the change (step 72), inferring the identity of the person responsible for the change (step 74), and/or inferring the reason(s) for the change (step 76), e.g., based on queries to the changed device, the control system, enterprise databases and the like (steps 64-70). The inferences—and the queries upon which they are based—in connection with the illustrated embodiment are discussed below; other embodiments may make other inferences, instead or in addition, and may base them on other queries, instead or in addition.

In step 62, the CDS 30 responds to detection of a change to a configurable element by determining and/or inferring the time of the change. Specifics of the determination or inference vary with in accord with the manner of detection, the type of the configurable elements, and so forth.

Thus, for example, in the case of changes that are expected to be detected in real-time, e.g., changes detected in step 54 via alert signalling received directly from the changed element, the CDS 30 takes the time of alert as an estimate of the time of change. See step 62A. In instances where the CDS queries the CDS for more detailed data, e.g., as in step 54B, a timestamp or other information returned by the query can further inform the estimate of the time of change.

By way of further example, in the case of changes that are determined by polling, e.g., changes detected in step 52, the CDS estimates as the time of change (or, perhaps, more accurately, the period of change) the time interval since the configurable element was last updated by the Configurator (or Download Service) or since the last polling, whichever is later. Again, in instances where the CDS queries the CDS for more detailed data, e.g., as in step 52B, a timestamp or other information returned by the query can further inform the estimate of the time of change.

By way of still further example, in the case of changes to a configurable element that are detected by the Configurator, e.g., in step 56, the CDS estimates as the period of change the time interval since the configurable element was last updated by the Configurator (or Download Service). Again, in instances where the CDS queries the CDS for more detailed data, e.g., as in step 56, a timestamp or other information returned by the query can further inform the estimate of the time of change.

By way of still further example, the time of change may be indicated in an alert generated by a changed element or by another element of the control system. In such cases, the time of change can be determined directly from the alert.

In step 64, the CDS 30 queries the element whose configuration has been changed to discern the identity of workstation, personal computer, portable computer, PDA or other device that made the change. The CDS can also query the changed element for the identity of the person responsible for the change, as well as the reason(s) for the change, though such information would not typically expected to be stored in the changed elements (particularly, for example, if it is a controller or field device). Regardless, the querying of step 64 can be in connection with a more detailed data query, e.g., as of the type discussed above in connection with step 54B, and/or it can be a separate query from the CDS to that element.

In step 66, the CDS 30 queries the network 14 (and, more generally, the control system) for a "live list" of active devices on the local control network from which the identity of the person/device responsible for the change may be inferred. If the change is estimated (e.g., in step 62) to have recently occurred, the query is for currently or recently active devices. If the change occurred earlier, the CDS queries the control system for devices active around the estimated time of the change, e.g., as determined in step 62.

The query of step 66 is directed to net log lists, IP address tables and other indicia of devices (such as workstations, personal computers, portable computers and PDAs, to name a few examples) communicatively coupled to network 14 and, more particularly, to a network segment (e.g., 14B) on which the changed element resides. Depending on the configuration of network 14 and/or control system 5, the CDS directs these queries to intrusion detection apparatus, routers, switches, gateways and or other elements (not shown) of the network 14 that are responsible authorizing elements on the network, granting them identities (e.g., IP addresses) and/or otherwise permitted them to communicate with (and, more particularly, for example, to configure) to effect the detected change.

In step 68, the CDS 30 likewise queries the network 14 (and, more generally, the control system) for a list of "live" (or active) users on the local control network, also for purposes of inferring the identity of the person/device responsible for the change. As above, if the change is estimated (e.g., in step 62) to have recently occurred, the query is for currently or recently active users. If the change occurred earlier, the CDS queries the control system queries for users active around the estimated time of the change.

The query of step 68 is directed to user lists, process lists, and other indicia of users logged into network 14 and, more particularly, to a network segment (e.g., 14B) on which the changed element resides. Depending on the configuration of network 14 and/or control system 5, the CDS directs these queries to workstations and/or other elements (not shown) of the network 14 into which users may log for access, e.g., to the changed element.

In step 70, the CDS 30 queries control and "enterprise" databases for information from which can be discerned the actual or possible identity of the person responsible for the change and/or the actual or possible reasons for the change. The queried databases includes asset management, employment, IT or other databases and/or other stores of information about the control system, the devices and/or the people with potential access to it and/or responsible for changing it, along with maintenance schedules, etc. These may be databases and stores of the type discussed above in connection with elements 34A-34E and/or they may be other databases and stores that are directly or indirectly coupled to the control system and, more particularly, to CDS 30, e.g., via network 14 or otherwise.

The query of step 70 can be directed to, by way of non-limiting example, employee lists (including recent hire lists and recent termination lists) that include user names, vacation/sick/time-off lists, punch-card data or other time-in and time-out information, areas of technical responsibility, areas of responsibility of physical plan, plant and network access privileges, and so forth, along with maintenance schedules, repair logs, repair requests, and so forth.

In step 72, the CDS discerns the identity of the device responsible for the change, if not evident, e.g., from the query performed in step 64. By way of example, the CDS 30 winnows down the live list to identify workstations, personal computers, portable computers, PDAs and other devices on which a logged-in user might effect the change. By way of example, the CDS 30 can further winnow down the list to identify (a) devices from which a change is expected to be made (e.g., a plant floor-based workstation, and/or (b) unexpected devices from which a surreptitious change might be made (e.g., an unregistered portable computer or PDA).

By way of still further example, the CDS can winnow down the list of live devices by reconciling them against information gained in step 70 regarding the capabilities of those devices. This may lead to an indication of a likely device or devices, e.g., where the CDS determines that only one of the active devices on the same network segment (e.g., 14A) as the changed element is likely capable of effecting the change—such as may be the inference where the list of live devices on that segment includes a singe user-controllable device, such as PDA 40 or a portable computer, along with one or more controllers or field devices (which, as a general matter, are less amenable to direct user control).

Following winnowing, the CDS can query the likely device(s) for additional information from which an inference of responsibility may be drawn. This includes, by way of non-limiting example, user lists, process lists, and other indicia of users who used the device at or around the time of the change, network connectivity lists and other indicia of networks, etc., to which the device was coupled at about that time, and so forth.

In some embodiments of the invention, apart from the Configurator, only authorized devices may be used to configure the configurable elements (or at least selected ones of the configurable elements, e.g., those deemed mission critical). One such device here, a PDA (by way of non-limiting example) that is coupled to controller 10A—is illustrated in FIG. 2, by way of non-limiting example. In addition to incorporating security codes that are required to make changes to those elements, such a device 40 can execute software that queries the user in connection with each change he/she makes with the device, e.g., with a pop-up dialog box, or otherwise, for his/her identity and the reason(s) for the change. Alternatively or in addition, such software can execute on the device 40, e.g., as a proxy for the CDS 40, and can query memory locations or otherwise to provide information required of the query of step 72.

In step 74, the CDS discerns the identity of the person responsible for the change. By way of example, the CDS 30 winnows down the live list to identify users with sufficient access and permissions to effect the signaled change, e.g., as determined from information gained in step 70. It can also use that information to winnow down the list to identify (a) users who are expected to make changes (e.g., field engineers), and/or (b) users who are not expected to make changes and whose log-ins might suggest surreptitious activity.

Combining the operations in steps 72 and 74, the CDS can infer a likely user (or users), e.g., as where the CDS determines that of plural devices active on the network at the time of the change, one was in use at that time by a logged-in user whose technical areas of responsibility included apparatus in the nature of the changed element and/or whose physical plant responsibilities include that element and/or who was scheduled to perform maintenance on that or nearby element.

The CDS can make other use of information from the enterprise or control databases in winnowing down the live list of users. By way of further example, it can access a maintenance database to discern which of the users on the live list were expected to make a detected configuration change. Alternatively or in addition, it can access personnel databases to identify users that were scheduled to have been on vacation at the time the change was made.

In step 76, the CDS discerns the reason (or possible reasons) for the change. To this end, the CDS 30 matches information gained in step 70 with information gained in steps 62 (and possibly steps 72 and 74) to identify maintenance requests, error logs or other indicia of reasons for a change. Thus, for example, if the configuration of an actuator 18 is changed (other than through action of the Configurator) following successive maintenance log entries suggesting faulty operation, the CDS 30 may infer that the reason for change was to replace (or repair) the faulty unit. The CDS 30 may corroborate the inferences with other information from the database and/or from the live user and live device logs, e.g., as where the field technician with responsibility for maintenance of the relevant portion of the plant was on duty and logged-in at the time of the apparent maintenance action.

As noted above, the inferences made in the illustrated embodiment and discussed above in connection with steps 62 and 72-76, are by way of example. Other embodiments may make other inferences instead or in addition to those discussed here, e.g., based on broken connections, incomplete processes, non-logged users, etc. Moreover, the aforementioned inferences may be based on queries other than, or in addition to, those discussed in steps 64-70. Thus, by way of example, the CDS can query one or more users whom it infers may have made the change, e.g., by way of a text message-based query, email-based query, pop-up dialog box or otherwise to ask his/her identity, their location at or around the time of the change, and/or for the reason for the change. Still, further, the "reason" inferred, e.g., in step 76, may comprise a multiple possible reasons—e.g., in instances where the change can be attributed to several possible causes (mutually exclusive or otherwise).

Regardless, in step 80, the CDS transmits the inference(s) to the CTS along with the other data discussed above in connection with steps 52, 54, and 56. As above, these transfers to the CTS can be via RPC calls, via calls to functions the CTS exposes in an applications program interface (API), or otherwise. In the illustrated embodiment, the transfers to the CTS are effected by XML files.

Described above are apparatus, systems and methods meeting the aforementioned objects, among others. It will be appreciated that the embodiments described herein are merely examples of the invention and that other embodiments, making changes to that shown herein, are within the scope of the invention. Thus, by way of non-limiting example, it will be appreciated that one or more of steps 62 and 76 may be executed by the CTS and/or other elements of the control system. Along these lines, for example, the CDS 30 may transfer the live lists of users and/or devices to the CTS which, itself, may execute one or more of the operations discussed above in connection with steps 72-76, by way of non-limiting example. In view of the foregoing, what we claim is:

The invention claimed is:

1. A system for process, environmental, manufacturing or industrial control, comprising:
one or more configurable elements that are coupled to a control network,
a device that is coupled to the control network and that is capable of effecting a change to one or more of the configurable elements,
a change tracking system that records changes to the one or more configurable elements, and
a change detection system that is in communications coupling with the one or more configurable elements and with the change tracking system, the change detection system responding to detected changes in one or more of those elements by inferring at least one of an identity of a person, a device, and combination thereof that is responsible for a change, the time of the change, and/or the reason for the change.

2. The control system of claim 1, wherein the change detection system infers-the identity of the person responsible for a change from information resident on the device and/or supplied by the device that made the change.

3. The control system of claim 2, wherein the device that made the change executes software that identifies the user who was operating that device at the time of the change.

4. The control system of claim 3, wherein the software queries the user for identifying information prior to making the change.

5. A system for process, environmental, manufacturing or industrial control, comprising:
one or more configurable elements,
a change tracking system that records changes to the one or more configurable elements, and
a change detection system that is in communications coupling with the one or more configurable elements and with the change tracking system, the change detection system responding to detected changes in one or more of those elements by inferring at least one of an identity of a person, a device, and a combination thereof that is responsible for a change, the time of the change, and/or the reason for the change, wherein the change detection system responds to a change alert signaling indicating that the configuration of a configurable element has been changed by querying a control network to which that element is coupled for a list of users that are logged-in or active on the network.

6. The control system of claim 5, wherein the change detection system infers the identity of a person responsible for a change from a list of live users on a control network to which one or more of the configurable elements are coupled.

7. The control system of claim 6, wherein live users are users that are any of logged-in or active on the control network at the time a change is made.

8. The control system of claim 5, wherein the change detection system winnows down the list of live users to identify users with sufficient access and permissions to effect the signaled change.

9. The control system of claim 8, wherein the change detection system further winnows-the list to identify one or more of (i) users who are expected to make a change to the one or more configurable elements, and (ii) users who are not expected to make such changes.

10. The control system of claim 5, wherein the change detection system queries any of an asset management, employment, information technology, or other database, or a store to identify any of users and/or devices with potential access to the control network.

11. The control system of claim 5, wherein the change detection system infers-the identity of a person responsible for the change from information resident on and/or supplied by the device that made the change.

12. The control system of claim 11, wherein the device that made the change executes software that identifies the user who was operating that device at the time of the change.

13. The control system of claim 12, wherein that software queries the user for identifying information prior to making the change.

14. A method for process, environmental, manufacturing or industrial control, the method comprising:
effecting a configuration change in one or more elements of a control system,
detecting the change,
with a change detection system, inferring at least one of an identity of a person, a device, and a combination thereof that is responsible for a change, the time of the change, and/or the reason for the change, and
with the change detection system, responding to a change alert signaling indicating that the configuration of a configurable element has been changed by querying a control network to which that element is coupled for a list of users that are any of logged-in or active on that network.

15. The method of claim 14, wherein the change detection system executes the step of inferring the identity of a person responsible for a change from a list of live users on a control network to which one or more of the configurable elements are coupled.

16. The method of claim 15, wherein live users are users that are any of logged-in or active on the control network at the time a change is made.

17. The method of claim 14, wherein the change detection system executes the step of winnowing down the list to identify users with sufficient access and permissions to effect the signaled change.

18. The method of claim 17, wherein the change detection system executes the step of further winnowing-the list to identify one or more of (i) users who are expected to make a change to the one or more configurable elements, and (ii) users who are not expected to make such changes.

19. The method of claim 14, wherein the change detection system executes the step of querying any of an asset management, employment, information technology, or other database, or a store to identify any of users and/or devices with potential access to the control network.

20. The method of claim 14, wherein the change detection system executes the step of inferring the identity of a person responsible for the change from information resident on and/or supplied by the device that made the change.

21. The method of claim 20, comprising executing, on the device that made the change, software that identifies the user who was operating that device at the time of the change.

* * * * *